(12) United States Patent
Wang et al.

(10) Patent No.: US 12,732,779 B2
(45) Date of Patent: Sep. 8, 2026

(54) METHOD AND DEVICE FOR TRANSMITTING DATA FOR MULTICAST SERVICE IN WIRELESS COMMUNICATION SYSTEM

(71) Applicant: Samsung Electronics Co., Ltd., Gyeonggi-do (KR)

(72) Inventors: Hong Wang, Beijing (CN); Lixiang Xu, Beijing (CN); Weiwei Wang, Beijing (CN)

(73) Assignee: Samsung Electronics Co., Ltd (KR)

( * ) Notice: Subject to any disclaimer, the term of this patent is extended or adjusted under 35 U.S.C. 154(b) by 919 days.

(21) Appl. No.: 17/794,802

(22) PCT Filed: Jan. 22, 2021

(86) PCT No.: PCT/KR2021/000897
§ 371 (c)(1),
(2) Date: Jul. 22, 2022

(87) PCT Pub. No.: WO2021/150053
PCT Pub. Date: Jul. 29, 2021

(65) Prior Publication Data

US 2023/0141637 A1 May 11, 2023

(30) Foreign Application Priority Data

Jan. 22, 2020 (CN) ......................... 202010075665.4

(51) Int. Cl.
*H04W 4/06* (2009.01)
*H04W 76/10* (2018.01)
*H04W 76/30* (2018.01)

(52) U.S. Cl.
CPC ............ *H04W 4/06* (2013.01); *H04W 76/10* (2018.02); *H04W 76/30* (2018.02)

(58) Field of Classification Search
CPC ........ H04W 4/06; H04W 76/10; H04W 76/30
See application file for complete search history.

(56) References Cited

U.S. PATENT DOCUMENTS 12,185,195 B2 * 12/2024 Wang .................. H04L 12/4641
2013/0016645 A1 * 1/2013 Moriwaki ........... H04L 12/1886
370/312

(Continued)

FOREIGN PATENT DOCUMENTS

CN 104254054 12/2014
CN 109429183 3/2019

(Continued)

OTHER PUBLICATIONS

3GPP TS 38.401 V16.0.0 (Dec. 2019), 3rd Generation Partnership Project; Technical Specification Group Radio Access Network; NG-RAN; Architecture description (Release 16) (Year: 2019).*

(Continued)

*Primary Examiner* — Justin T Van Roie
(74) *Attorney, Agent, or Firm* — The Farrell Law Firm, P.C.

(57) ABSTRACT

A method and device for transmitting data in a wireless communication network are provided. The method includes: receiving a first multicast session start request message including an identification of a packet data unit (PDU) session corresponding to a multicast service and information on a multicast group from a core network; transmitting a second multicast session start request message including the information on the multicast group to a distribution unit (DU) of the access network; receiving a second multicast session start response message in response to the second multicast session start request message from the DU of the access network; and transmitting a first multicast session (Continued)

start response message to the core network in response to the first multicast session start request message.

10 Claims, 14 Drawing Sheets

(56) References Cited

U.S. PATENT DOCUMENTS

| | | | | |
|---|---|---|---|---|
| 2013/0188547 | A1* | 7/2013 | Moriwaki | H04W 72/30 370/312 |
| 2016/0249183 | A1* | 8/2016 | Kim | H04W 4/06 |
| 2019/0215762 | A1* | 7/2019 | Kim | H04W 8/005 |
| 2019/0289470 | A1 | 9/2019 | Vaidya et al. | |
| 2019/0327665 | A1 | 10/2019 | Geng et al. | |
| 2019/0349139 | A1 | 11/2019 | Park et al. | |
| 2020/0267513 | A1* | 8/2020 | Zhu | H04N 21/6181 |
| 2020/0323024 | A1* | 10/2020 | Huang | H04L 12/185 |
| 2021/0014722 | A1 | 1/2021 | Han et al. | |
| 2021/0211926 | A1 | 7/2021 | Han et al. | |
| 2022/0263879 | A1* | 8/2022 | Li | H04L 12/1407 |
| 2023/0011492 | A1* | 1/2023 | Åkesson | H04W 76/40 |

FOREIGN PATENT DOCUMENTS

| | | |
|---|---|---|
| CN | 109982266 | 7/2019 |
| CN | 110035472 | 7/2019 |
| CN | 110312282 | 10/2019 |
| CN | 1110351043 | 10/2019 |
| CN | 110636457 | 12/2019 |
| EP | 3 499 919 | 6/2019 |
| EP | 3 570 577 | 11/2019 |
| EP | 3 675 405 | 7/2020 |
| WO | WO 2018/236867 | 12/2018 |
| WO | WO 2019/037779 | 2/2019 |
| WO | WO 2019/091456 | 5/2019 |
| WO | WO 2019/098903 | 5/2019 |
| WO | WO 2019/161927 | 8/2019 |
| WO | WO 2019/166968 | 9/2019 |

OTHER PUBLICATIONS

3GPP TS 38.401 V16.0.0, (Dec. 2019), pp. 54.

Chinese Office Action dated Aug. 28, 2024 issued in counterpart application No. 202010075665.4, 20 pages.

PCT/ISA/210 Search Report issued on PCT/KR2021/000897, Apr. 19, 2021, pp. 3.

PCT/ISA/237 Written Opinion issued on PCT/KR2021/000897, Apr. 19, 2021, pp. 4.

Chinese Office Action dated Apr. 21, 2025 issued in counterpart application No. 202010075665.4, 20 pages.

Chinese Office Action dated Aug. 21, 2025 issued in counterpart application No. 202010075665.4, 21 pages.

CATT, “Consideration on the RRC Message Transfer Between CU and Du”, R3-171456, 3GPP TSG RAN WG3 Meeting #96, May 15-19, 2017, 3 pages.

Chinese Office Action dated Nov. 12, 2025 issued in counterpart application No. 202010075665.4, 10 pages.

* cited by examiner

FIG. 12

METHOD AND DEVICE FOR TRANSMITTING DATA FOR MULTICAST SERVICE IN WIRELESS COMMUNICATION SYSTEM

CROSS-REFERENCE TO RELATED APPLICATION(S)

This application is a National Phase Entry of PCT International Application No. PCT/KR2021/000897, which was filed on Jan. 22, 2021 and claims priority to Chinese Patent Application No. 202010075665.4, which was filed on Jan. 22, 2020, the contents of which are incorporated herein by reference.

BACKGROUND

1. Field

The present disclosure relates to wireless communication technology, and more particularly, to a method and device for transmitting data in a radio communication system.

2. Description of the Related Art

Modern mobile communication increasingly tends to provide users with multimedia services transmitted at a high rate. FIG. 1 shows a system architecture diagram of System Architecture Evolution (SAE).

In FIG. 1, a user equipment (UE) 101 is a terminal device for receiving data. An Evolved Universal Terrestrial Radio Access Network (E-UTRAN) 102 is a radio access network, which includes a macro base station (eNodeB/NodeB) that provides UE with an interface to access the radio network. A mobility management entity (MME) 103 is responsible for managing mobility context, session context, and security information of the UE. A serving gateway (SGW) 104 mainly provides functions of a user plane, while the MME 103 and the SGW 104 may be in a same physical entity. A packet data network gateway (PGW) 105 is responsible for functions such as charging and lawful interception, and may also be in the same physical entity as the SGW 104. A policy and charging rules function entity (PCRF) 106 provides quality of service (QoS) policies and charging criteria. A Serving General Packet Radio Service (GPRS) Support Node (SGSN) 108 is a network node device that provides routing for data transmission in a Universal Mobile Telecommunication System (UMTS). A Home Subscriber Server (HSS) 109 is a home subsystem of the UE, which is responsible for protecting user information including the current location of the user equipment, the address of the serving node, user security information, and the packet data context of the UE or the like.

FIG. 2 shows a system architecture diagram of a next-generation network or a fifth-generation (5G) network.

In FIG. 2, a user equipment (UE) 201 is a terminal device for receiving data. The Next Generation Radio Access Network (NG-RAN) 202 is a radio access network, which includes base stations (gNB or eNB connected to 5G core network (5GC), and the eNB connected to 5GC is also called ng-gNB) that provide UE with an interface to access the radio network. An access and mobility management function entity (AMF) 203 is responsible for managing mobility context and security information of the UE. A user plane function entity (UPF) 204 mainly provides functions of the user plane. A session management function entity SMF 205 is responsible for session management. A data network (DN) 206 includes such as, services of the operators, access to internet, and third-party services or the like.

SUMMARY

According to one aspect of embodiments of the present disclosure, there is provided a method for transmitting data in a wireless communication network by a control plane (CP) of an access network, comprising: receiving a first multicast session start request message including an identification of a packet data unit (PDU) session corresponding to a multicast service and information on a multicast group from a core network; transmitting a second multicast session start request message including the information on the multicast group to a distribution unit (DU) of the access network; receiving a second multicast session start response message in response to the second multicast session start request message from the DU of the access network; and transmitting a first multicast session start response message to the core network in response to the first multicast session start request message.

According to yet another aspect of the embodiments of the present disclosure, there is provided a method for transmitting data in a wireless communication network by a user plane (UP) of an access network, comprising: receiving a multicast session start request message from a control plane (CP) of the access network, wherein the multicast session start request message includes an identification of a packet data unit (PDU) session corresponding to a multicast service and information on the multicast group; transmitting a multicast session start response message to the CP of the access network, in response to the multicast session start request message; joining a multicast group based on information on the multicast group; and receiving multicast data from a core network.

According to yet another aspect of the embodiments of the present disclosure, there is provided a method for transmitting data in a wireless communication system by a control plane (CP) of an access network, comprising: receiving a first multicast session start request message from a core network; determining whether to use a unicast bearer or a multicast bearer to transmit multicast data; and notifying the core network and a distribution unit (DU) of the access network of a result of the determination, wherein the first multicast session start request message includes an identification of a packet data unit (PDU) session corresponding to a multicast service.

According to yet another aspect of the embodiments of the present disclosure, there is provided a method for transmitting data in a wireless communication system by to a user plane (UP) of an access network, comprising: receiving a bearer determination notification from a control plane (CP) of the access network, the bearer determination notification indicating whether to use a unicast bearer or a multicast bearer to transmit multicast data; when the bearer determination notification indicates to use the unicast bearer, mapping data received from a core network to respective higher layer protocol corresponding to each unicast bearer or to a common higher layer protocol; and transmitting the data to a distribution unit (DU) of the access network through a tunnel, wherein whether to use the unicast bearer or the multicast bearer to transmit the multicast data is determined by the CP of the access network.

According to yet another aspect of the embodiments of the present disclosure, there is provided a method for transmitting data in a wireless communication system of a distribution unit (DU) of an access network, comprising:

receiving a bearer determination notification from a control plane (CP) of the access network, the bearer determination notification indicating whether to use a unicast bearer or a multicast bearer to transmit multicast data; and when the bearer determination notification indicates the unicast bearer, receiving the data from a user plane (UP) of the access network on respective tunnel corresponding to each unicast bearer and transmitting the data to the corresponding lower layer protocol, or receiving the data from the UP of the access network on a common tunnel and transmitting the data to the corresponding lower layer protocol respectively.

According to yet another aspect of the embodiments of the present disclosure, there is provided an apparatus of a control plane (CP) for transmitting data in a wireless communication system, the apparatus comprises a transceiver, and a processor configured to receive, through the transceiver, a first multicast session start request message including an identification of a packet data unit (PDU) session corresponding to a multicast service and information on a multicast group from a core network, transmit, through the transceiver, a second multicast session start request message including the information on the multicast group to a distribution unit (DU) of the access network, receive, through the transceiver, a second multicast session start response message in response to the second multicast session start request message from the DU of the access network, and transmit, through the transceiver, a first multicast session start response message to the core network in response to the first multicast session start request message.

According to yet another aspect of the embodiments of the present disclosure, there is provided an apparatus of a user plane (UP) for transmitting data in a wireless communication system, the apparatus comprises a transceiver, and a processor configured to receive, through the transceiver, a multicast session start request message from a control plane (CP) of the access network, wherein the multicast session start request message includes an identification of a packet data unit (PDU) session corresponding to a multicast service and information on the multicast group, transmit, through the transceiver, a multicast session start response message to the CP of the access network, in response to the multicast session start request message, joint a multicast group based on information on the multicast group, and receive multicast data from a core network.

According to yet another aspect of the embodiments of the present disclosure, there is provided an apparatus of a control plane (CP) for transmitting data in a wireless communication system, the apparatus comprises a transceiver, and a processor configured to receive, through the transceiver, a first multicast session start request message from a core network, determine whether to use a unicast bearer or a multicast bearer to transmit multicast data, and notify the core network and a distribution unit (DU) of the access network of a result of the determination, wherein the first multicast session start request message includes an identification of a packet data unit (PDU) session corresponding to a multicast service.

According to yet another aspect of the embodiments of the present disclosure, there is provided a distribution unit (DU) for transmitting data in a wireless communication system, comprising: a transceiver; and a processor configured to receive, through the transceiver, a bearer determination notification from a control plane (CP) of the access network, the bearer determination notification indicating whether to use a unicast bearer or a multicast bearer to transmit multicast data; and when the bearer determination notification indicates the unicast bearer, receive, through the transceiver, the data from a user plane (UP) of the access network on respective tunnel corresponding to each unicast bearer, and transmit, through the transceiver, the data to the corresponding lower layer protocol, or receiving the data from the UP of the access network on a common tunnel and transmitting the data to the corresponding lower layer protocol respectively.

According to the embodiments of the present disclosure, an improved method and device for multicast transmission are provided. It can avoid or reduce the extra overhead of multicast data transmission, improve the utilization efficiency of access network resources and/or air interface resources, and reduce transmission delay. Also, when the multicast transmission mode is transitioned, data loss can be reduced and the delay caused by the transition of the transmission mode can be reduced.

In addition, in the case of determining whether to use a unicast bearer or a multicast bearer to send data, by the control plane of the access network, the transition is more timely, and an impact on the core network can be reduced.

BRIEF DESCRIPTION OF THE DRAWINGS

The present disclosure will become more fully understood from the detailed description given hereinafter and the accompanying drawings which are given by way of illustration only, and thus are not limitative of the present disclosure and wherein:

FIG. 12 is a flowchart illustrating another exemplary method for transmitting data in a wireless communication system according to the third scheme of the present disclosure;

DETAILED DESCRIPTION

The technical solutions in the embodiments of the present disclosure will be clearly and completely described below in conjunction with the accompanying drawings in the embodiments of the present disclosure. Obviously, the described embodiments are part of the embodiments of the present disclosure, rather than all the embodiments of the present disclosure. Based on the embodiments of the present disclosure, all other embodiments obtained by those of ordinary skill in the art without creative work being made shall fall within the protection scope of the present disclosure.

Mobile terminal, also known as mobile user (UE, User Equipment), mobile user equipment, etc., can communicate with one or more core networks via a radio access network (for example, RAN, Radio Access Network). The mobile terminal can be a mobile terminal such as a mobile phone (or "cellular" phone) and a computer with a mobile terminal, for example, which can be a portable, pocket-sized, handheld, built inside the computer or vehicle-mounted mobile device, exchanging language and/or data with the radio access network.

In the description hereafter, the 5G system is used as an example to explain the embodiments of the present disclosure, a centralized unit (CU)-control plane (CP) is used as an example of the CP of the access network, a CU-user plane (UP) is used as an example of an UP of the access network, and the DU is used as an example of distribution unit of the access network. The access network may be the NG-RAN 202. However, the embodiment of the present disclosure is not limited to this, and the method described here is also applicable to the corresponding entities of other systems.

Scheme One

Figure 1:
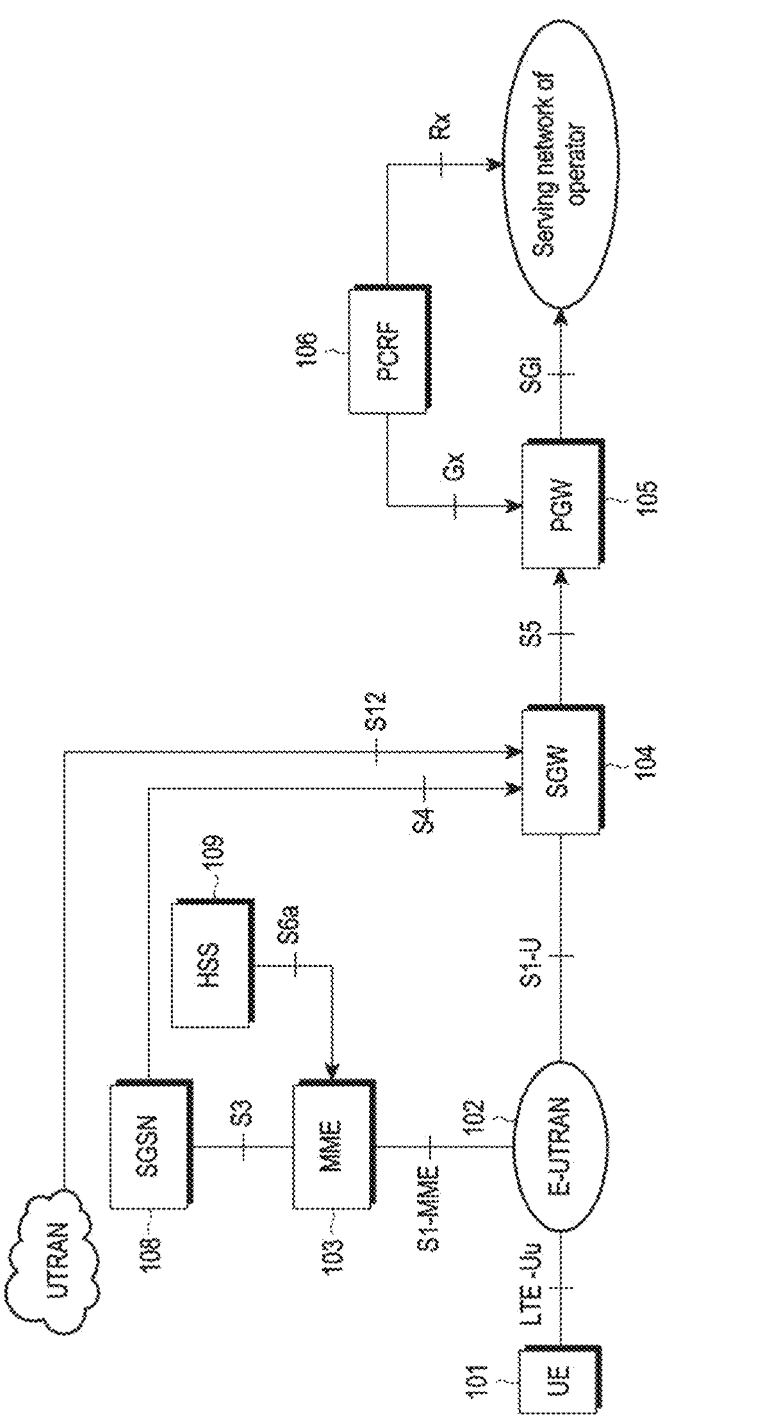
FIG. 1 illustrates a system architecture diagram of System Architecture Evolution (SAE)
Figure 2:
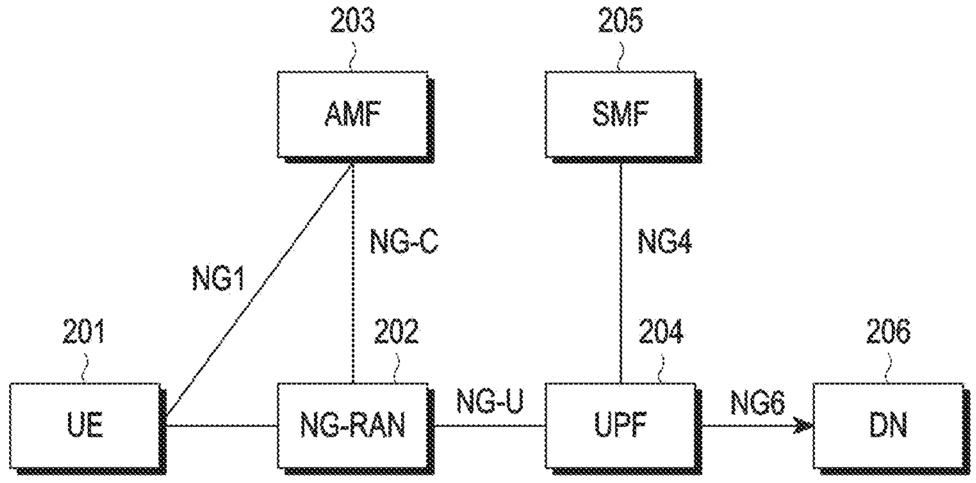
FIG. 2 illustrates a system architecture diagram of a next-generation network or a fifth-generation (5G) network.
Figure 3:
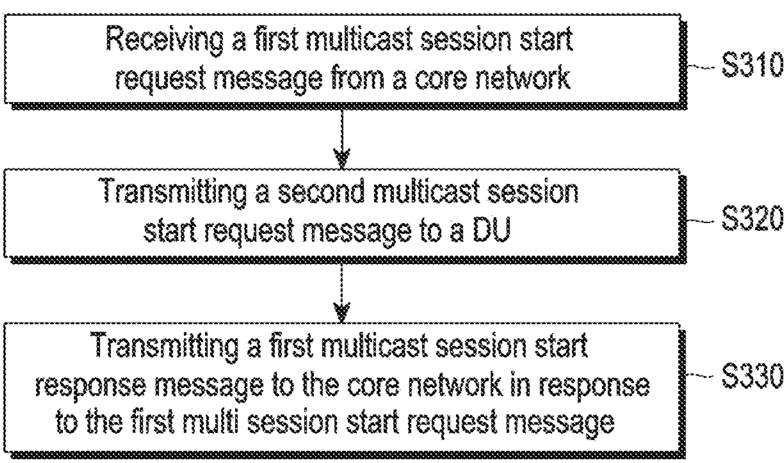
FIG. 3 is a flowchart illustrating an exemplary method for transmitting data in a wireless communication system according to the first scheme of the present disclosure.

FIG. 3 is a flowchart illustrating an exemplary method 300 for transmitting data in a wireless communication system according to the first scheme of the present disclosure. In one example, the method 300 may be implemented in the control plane (CP) of the access network at the access network side.

In method 300, in step S310, a first multicast session start request message is received from a core network. Specifically, the core network initiates the first multicast session start request message to the CU-CP. The first multicast session start request message includes at least a multicast service identification. Optionally, the first multicast session start request message includes an identification of a packet data unit (PDU) session corresponding to the multicast service.

In step S320, a second multicast session start request message is transmitted to a distributed unit (DU).

The CU-CP transmits a second multicast session start request message to the DU, the second multicast session start request message includes the identification of the multicast service. Optionally, the second multicast session start request message includes control information corresponding to the multicast service, the control information includes configuration information of the multicast channel.

In addition, the DU may transmit a notification message to the UE, in order to notify the UE to receive the control information of the multicast service.

The DU may transmit the control information including the identification of the multicast service on an air interface. The DU parses and saves the control information for a subsequent multicast data transmission.

Optionally, the DU may join a multicast group to receive multicast data from the core network.

Optionally, the DU allocates an IP address and a tunnel endpoint identifier (TEID) for receiving the multicast data, and notifies the CU-CP of the allocated IP address and TEID.

Optionally, the second multicast session start request message includes indication information indicating whether to use a synchronization protocol in the user plane or indicating a type of the synchronization protocol, and the DU determines whether to configure the synchronization protocol according to the indication information, or uses the indicated type of the synchronization protocol according to the indication information.

In step S330, in response to the first multicast session start request message, a first multicast session start response message is transmitted to the core network.

The CU-CP transmits the first multicast session start response message to the core network, the first multicast session start response message includes indication information to indicate whether to use the synchronization protocol in the user plane or to indicate the type of the synchronization protocol. The core network forwards the indication information to a multicast service serving center, and the multicast service serving center determines whether to configure the synchronization protocol according to the indication, or uses the indicated type of synchronization protocol to add synchronization information for the data.

Therefore, according to the embodiments of the present disclosure, the extra overhead of multicast data transmission can be avoided or reduced, the utilization efficiency of access network resources and/or air interface resources can be improved, and the transmission delay can be reduced.

Figure 4:
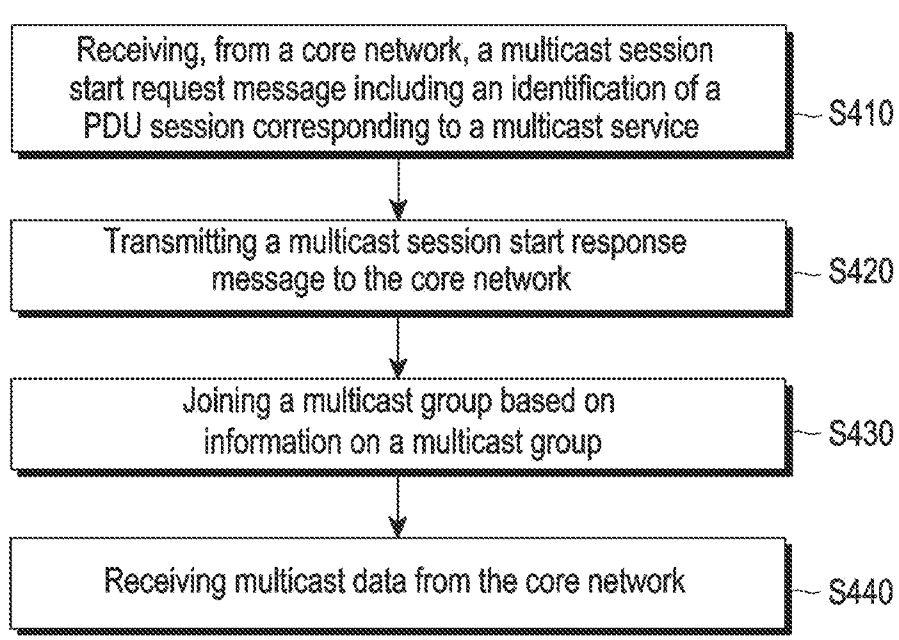
FIG. 4 is a flowchart illustrating another exemplary method for transmitting data in a wireless communication system according to the first scheme of the present disclosure.

FIG. 4 is a flowchart illustrating another exemplary method 400 for transmitting data in a wireless communication system according to the first scheme of the present disclosure. In one example, the method 400 may be implemented in the distribution unit DU at the access network side.

As shown in FIG. 4, in step S410, a multicast session start request message is received from the core network, and the multicast session start request message includes the identification of the packet data unit PDU session corresponding to the multicast service. In step S420, a multicast session start response message is transmitted to the core network and the multicast session start response message includes a service identification at least. In step S430, the multicast group is joined based on the information on the multicast group. In step S440, multicast data is received from the core network.

Therefore, according to the embodiment of the present disclosure, the DU directly accesses the multicast group, so that the extra overhead of multicast data transmission can be avoided or reduced, the utilization efficiency of access network resources and/or air interface resources can be improved, and transmission delay can be reduced.

Figure 5:
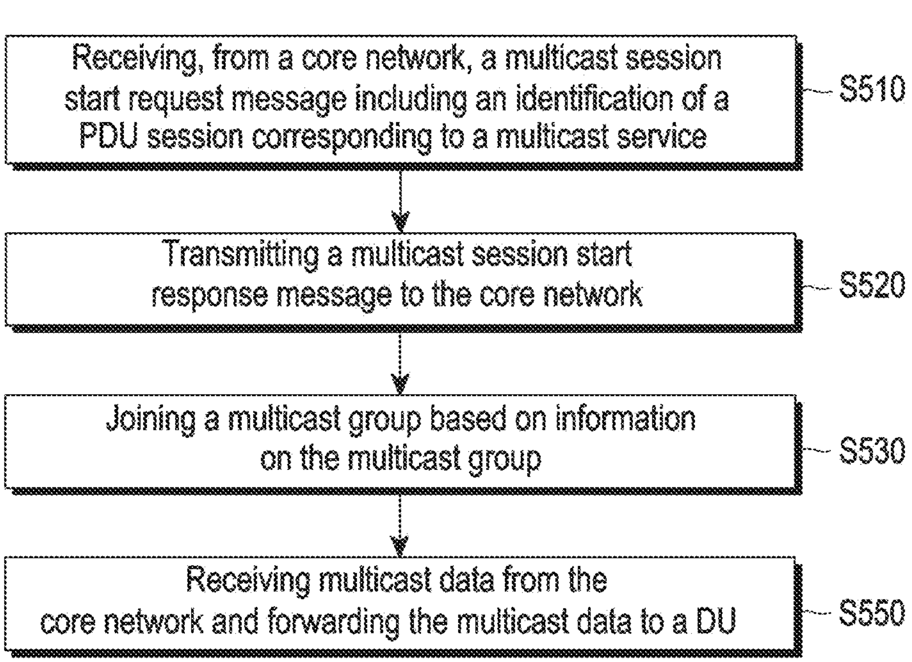
FIG. 5 is a flowchart of another exemplary method for transmitting data in a wireless communication system according to the first scheme of the present disclosure.

FIG. 5 is a flowchart of another exemplary method 500 for transmitting data in a wireless communication system according to the first scheme of the present disclosure. In an example, the method 500 may be implemented in the user plane (UP) of the access network at the access network side.

As shown in FIG. 5, in step S510, a multicast session start request message is received from the core network, the multicast session start request message includes the identification of the packet data unit PDU session corresponding to the multicast service. In step S520, a multicast session start response message is transmitted to the core network and the multicast session start response message includes a service identification at least. In step S530, the multicast group is joined based on the information on the multicast group. In step S540, the multicast data is received from the core network and forwarded to the distribution unit DU.

Therefore, according to the embodiment of the present disclosure, the access network UP accesses the multicast group, so that when the multicast transmission mode is transitioned, data loss can be reduced, and the delay caused by the transition of the transmission mode can be reduced.

Hereinafter, the detailed embodiments of the first scheme of the present disclosure will be described in detail with reference to the accompanying drawings.

Embodiment 1.1

Figure 6:
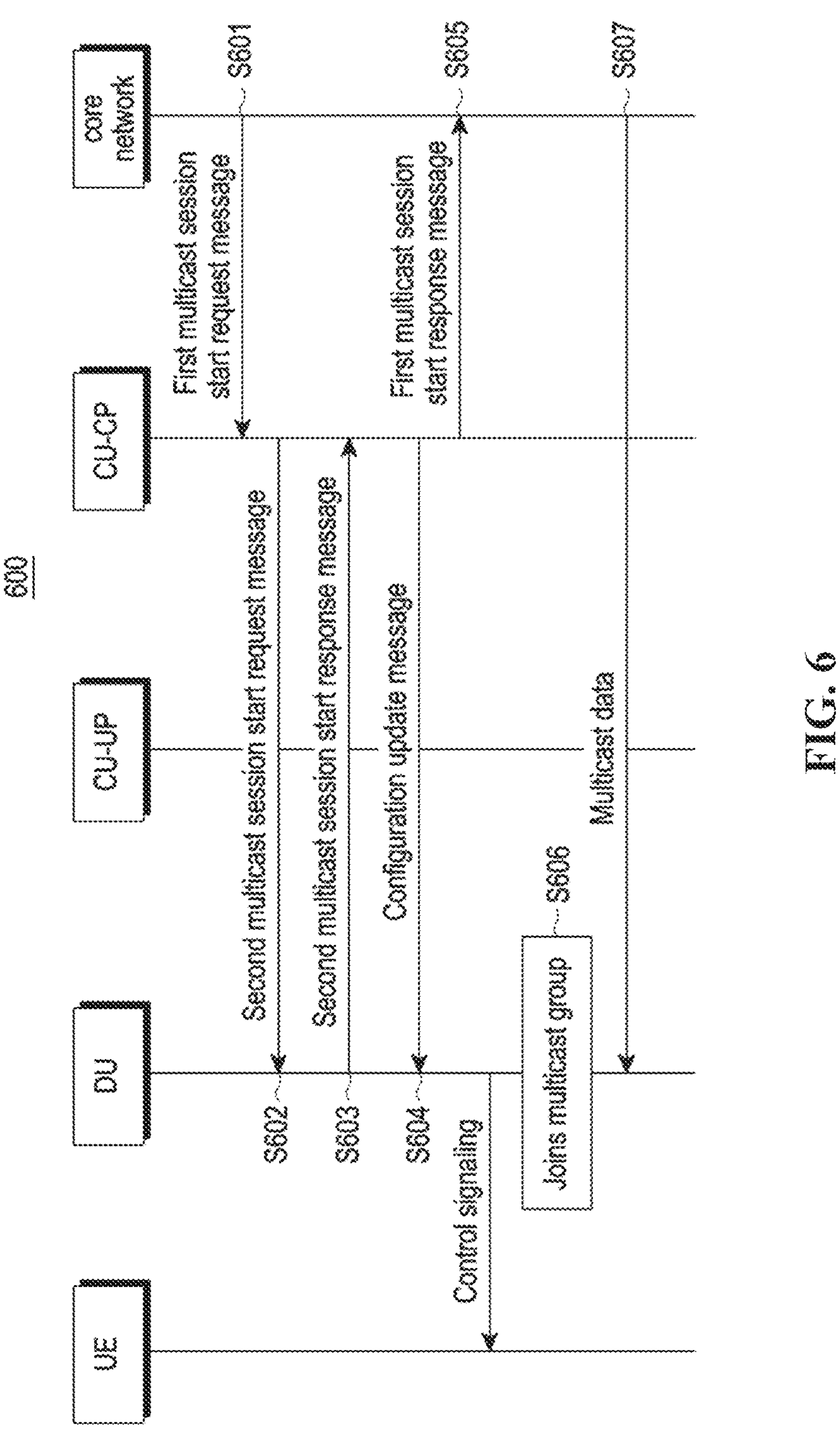
FIG. 6 illustrates a signal flow diagram of an exemplary method for transmitting data in a wireless communication system according to the first embodiment of the first scheme of the present disclosure.

FIG. 6 illustrates a signal flow diagram of an exemplary method 600 for transmitting data in a wireless communication system according to the first embodiment of the first scheme of the present disclosure. Those skilled in the art should understand that, in order to simplify the description, FIG. 6 only shows the steps related to the present disclosure.

In FIG. 6, in step S601, the core network transmits a first multicast session start request message to the CU-CP.

Here, the core network refers to an entity of the control plane in the core network, such as an entity AMF responsible for mobility management or the control entity for multicast services. However, the embodiments of the present disclosure are not limited to this, those skilled in the art can also use any other suitable entities.

When the entity in the core network receives the service start request transmitted by the multicast service serving center, the entity in the core network transmits the first multicast session start request message to the CU-CP. The first multicast session start request message may include an identification of multicast service, for example, to identify that the multicast service is a MBMS service. The first multicast session start request message may also include the service identification temporary mobile group identity (TMGI).

In addition, the first multicast session start request message may also include information such as a quality requirements of the multicast service (QoS information), the service scope of the multicast service or the like, and may also include the identification of packet data unit session (PDU session) of the unicast service corresponding to the multicast service, information of quality flow (QoS flow) included in PDU Session. The information of QoS flow includes the identification of QoS flow and quality requirements of QoS flow (QoS information). The first multicast session start request message may also include when the multicast data starts to be transmitted, the information on the multicast group (IP multicast) and the downlink tunnel identification, the information on the multicast group includes, for example, a multicast address and source address of the multicast group or the like.

In step S602, the CU-CP transmits a second multicast session start request message to the DU.

The CU-CP of the access network determines the multicast transmission mode. For example, the CU-CP may initiate a user statistics process and determine whether to use the multicast mode to transmit data of multicast service according to the number of users who need to receive multicast services. The multicast mode may be further divided into a multi-cell synchronization transmission and a single-cell multicast transmission.

The multi-cell synchronization transmission refers to a case that there are users who want to receive multicast services in multiple consecutive cells, so the CU-CP may determine to use the same resources in the multiple cells and transmit the same multicast data at the same time. In this way, the user may receive data uninterruptedly as moving in these cells, and the users at the edge of the cell may use signal superposition to receive the multicast data better. For example, the multimedia broadcast multicast service single frequency network (MBSFN) method in LTE is a method of multi-cell synchronization transmission.

The single-cell multicast transmission refers to a case where multicast data is transmitted asynchronously in different cells, for example, using different air interface resources and different transmitting times to transmit multicast data.

Different multicast modes require different information carried in the user plane. The CU-CP determines the multicast mode, and the multicast mode includes a multi-DU multi-cell multicast, a single-DU multi-cell multicast, a single-cell multicast and a unicast bearer. The specific explanation is as follows.

(1) Multi-DU multi-cell multicast, that is, different multicast of multi-cell under multiple DUs, which requires the use of a synchronization protocol, and a synchronization header being added by the multicast service serving center for the multicast data, wherein the synchronization header includes a timestamp. When receiving the timestamp, different DUs synchronously transmit data to the UE according to the time indicated by the timestamp. The timestamp is based on a synchronization time reference and synchronization cycle, and the synchronization time reference and synchronization cycle are pre-configured by both the multicast service serving center and the DU. At this time, the multicast service serving center needs to add a synchronization header, and the DU needs to transmit data to the UE according to the information of the synchronization header. The CU-CP transmits the second multicast session start request to the distribution unit DU.

(2) Single-DU multi-cell multicast and single-cell multicast, the former is synchronization multicast of multi-cell under one DU. The core network transmits multicast data to a certain DU through a user plane path, so it is not required synchronization among DUs nor to add a timestamp for multicast data, thus it is not required to use the same synchronization protocol as multi-DU multi-cell multicast. However, it is required to use a simple user-plane protocol, for example including a sequence number. A new user plane protocol layer or a new synchronization protocol type can be defined, and the new user plane protocol layer or a new synchronization protocol type includes the sequence number of the data. At this time, the multicast service serving center needs to add new header information according to the new user plane protocol layer or the new synchronization protocol type, while the DU transmits data to the UE according to its own configuration information and the sequence number in the header information. The CU-CP transmits the second multicast session start request message to the distribution unit DU.

(3) Unicast bearer. When the CU-CP determines to adopt unicast bearer, it transmits a unicast request to the core network.

The second multicast session start request message may be a single message, including the service identification of the multicast, the information on the multicast group (IP multicast) and the downlink tunnel identification, wherein the information on the multicast group may include the multicast address and source address of the multicast group. In addition, the second multicast session start request message may also include an indication of the transmission mode to indicate one of the aforementioned multi-DU multi-cell multicast, the single-DU multi-cell multicast, the single-cell multicast and the unicast bearer. Alternatively, the second multicast session start request message may also include indication information of the synchronization protocol, indicating whether to use the synchronization protocol, or indicating whether to use the synchronization protocol or a new user plane protocol, or indicating the type of the synchronization protocol.

In step S603, the DU transmits a second multicast session start response message to the CU-CP in response to the second multicast session start request message.

If the multicast service is transmitted in a tunnel manner, the second multicast session start response message includes the multicast service identification and the tunnel identification assigned by the DU for the multicast. The tunnel identification includes the IP address and the tunnel number.

The advantage of receiving data of multicast service in a tunnel manner is that it is simple and satisfies the basic requirements. If there is no need to perform multi-cell synchronization transmission among different DUs, the tunnel header information defined by the tunnel protocol can be used in a tunnel manner, which can reduce the information of the control header needed to be increased by the user plane.

In step S604, the CU-CP transmits a configuration update message to the DU.

When the CU-CP receives the first multicast session start request message, the CU-CP needs to notify the UE of the start of the multicast service and the wireless data channel configuration information of the multicast service. The CU-CP transmits a configuration update message to the DU, one objective of which is to notify the DU to transmit a multicast notification message to the UE, and the other objective of which is to transmit the wireless data channel configuration information of the multicast to the DU. The DU transmits the wireless data channel configuration information of multicast to the UE on the multicast control channel (such as the multicast control channel (MCCH) channel), so that the UE can perform channel configuration according to the wireless data channel configuration information, and can receive multicast data on the wireless data channel thereafter. The configuration update message is a common message, the configuration update message of the current F1 interface or downlink common RRC transmission can be reused, or a new F1 message can be defined.

When receiving the multicast services, the UE may be in any state. If the UE is in idle mode, the UE does not always receive cell signaling. Therefore, firstly, the DU needs to transmit a multicast notification message to the UE in order to wake up the UE, and then the UE receives the information on the multicast control channel.

The CU-CP transmits the configuration update message to the DU to notify the DU to generate multicast notification message on air interface and transmit it to the UE. After receiving the configuration update message transmitted by the CU-CP, the DU needs to transmit a multicast notification message to the UE. The multicast notification message may only include limited information, for example, it only notifies the cell that there is a multicast service about to start, but does not notify the identification of the specific service. After receiving the multicast notification message, the UE receives complete multicast information on the multicast control channel, including service identification, wireless data channel configuration information corresponding to the multicast, and so on.

In one example, the configuration update message includes one or more of the following information.

Synchronization area identification. It can be the identification of a group of cells. These cells use the wireless data channel configuration included in the message in step S404 to transmit multicast services. Or it can be an identification of a specific area, such as a multicast synchronization area (MBSFN) identification, Multicast control channel update time. The configuration information of the wireless data channel corresponding to the multicast service is transmitted by the DU to the UE at this time. The update time may be the sequence number of a certain cycle or the sequence number of the cell synchronization subframe SFN.

Service identification of multicast, for example, TMGI.

Wireless data channel configuration information, which is the wireless data channel configuration information corresponding to the multicast service. It may include physical layer multicast channel information, for example, subframe configuration, scheduling information, multicast service identification transmitted on the channel, and information of corresponding logical channel and so on.

Indication of transmission mode. As described in step S402, the CU-CP determines the transmission mode, and the configuration update message may include an indication of the transmission mode to indicate one of the multi-DU multi-cell multicast, single-DU multi-cell multicast, single-cell multicast, and unicast bearer.

Indication information of the synchronization protocol, to indicate whether to use the synchronization protocol, or to indicate whether to use the synchronization protocol or a new user plane protocol, or to indicate the type of the synchronization protocol.

The DU may parse the configuration update message, obtain and save the information included in the configuration update message. When the DU obtains the multicast control channel update time, the DU needs to transmit the multicast notification message for the multicast to the UE at least one cycle before the multicast control channel update time. The multicast notification message is illustrated in FIG. 6 as a control signaling. The DU saves the multicast identification and the wireless channel configuration information corresponding to the multicast, to be used for subsequent multicast data transmission.

The DU parses the configuration update message and transmits a multicast notification message to the UE according to the configuration update message, thereby reducing the signaling interaction between the DU and the CU-CP.

It should be noted that the information transmitted at step S602 and step S604 may be transmitted by one message and executed before step S603. That is, the second multicast session start request may include a configuration update message. In other words, the second multicast session start request may include one or more of the following information.

Synchronization area identification, which can be the identification of a group of cells. These cells use the wireless data channel configuration included in the message to transmit multicast services.

Multicast control channel update time. The configuration information of the wireless data channel corresponding to the multicast service is transmitted by the DU to the UE at this time. The update time may be the sequence number of a certain cycle, or the sequence number of the cell synchronization subframe SFN.

Service identification of multicast, for example, TMGI,

Wireless data channel configuration information. It is wireless data channel configuration information corresponding to the multicast service, and may include physical layer multicast channel information, for example, subframe configuration, scheduling information, multicast service identification transmitted on the channel, and information of corresponding logical channel and so on.

Multicast address and multicast source address corresponding to the multicast.

GTP downlink tunnel identification, which is used for multicast data transmission between the core network and the DU.

Indication of the transmission mode to indicate one of multi-DU multi-cell multicast, single-DU multi-cell multicast, single-cell multicast, and unicast bearer.

Indication information of the synchronization protocol, to indicate whether to use the synchronization protocol, or to indicate whether to use the synchronization protocol or a new user plane protocol, or to indicate the type of the synchronization protocol.

After receiving the multicast address and the multicast source address corresponding to the multicast, the DU can join the multicast group indicated by the multicast address and the multicast source address, and multicast data is received in IP multicast manner. When the DU receives the multicast control channel update time, the DU needs to transmit a multicast notification message for the multicast to the UE at least one cycle before the update time. The multicast notification message is illustrated in FIG. 6 as a control signaling.

In step S605, the CU-CP transmits a first multicast session start response message to the core network, and the first multicast session start response message is transmitted in response to the first multicast session start request message.

The CU-CP reports the response message of the service establishment request to the core network. If multicast data is transmitted in a tunnel manner, the CU-CP transmits the tunnel identification assigned by the DU for the multicast service to the core network. The first multicast session start response message may include tunnel identification assigned by multiple DUs, so that the user plane of the core network may transmit multicast data to the tunnel indicated by the tunnel identification. The first multicast session start response message may also include an indication of the transmission mode to indicate one of multi-DU multi-cell multicast, single-DU multi-cell multicast, multicast, and unicast bearer. Indication information of the synchronization protocol may also be included to indicate whether to use the synchronization protocol, or to indicate whether to use the synchronization protocol or a new user plane protocol, or to indicate the type of the synchronization protocol.

The core network and the DU adopt the same user plane protocol, and the CU-CP determines which user plane protocol to use, and notify it to the core network.

In step S606, the DU joins the multicast group. After receiving the message of step S404, according to the multicast address and the multicast source address included in the message, the DU joins the multicast group indicated by the multicast address and the multicast source address. Therefore, the multicast data is directly transmitted from the core network to the DU without going through the CU-UP, which reduces the delay of data transmission.

In step S607, the core network transmits the multicast data to the DU in an IP multicast manner.

After receiving the data, the DU transmits the multicast data to the UE on the wireless data channel corresponding to the multicast.

According to this embodiment, the DU directly joins the multicast group, which can avoid or reduce the extra overhead of multicast data transmission, improve the utilization efficiency of access network resources and/or air interface resources, and reduce transmission delay.

In one example, if it is not required to perform synchronization transmission of multi-cell on different DUs, a simple user plane protocol can be adopted for the user plane between the core network and the CU-UP. A simplified version of the synchronization protocol can be defined. In the core network, the simplified version of the synchronization protocol terminates at the core network node or the multicast service server, while in the access network, the simplified version of the synchronization protocol terminates at the DU. The synchronization protocol adds synchronization header information to the data, and the synchronization header information can include the sequence number of the data.

If it is required to perform synchronization transmission of multi-cell on different DUs, the currently defined synchronization protocol can be used. The access network CU-CP determines which method is adopted. When the access network CU-CP transmits a message to the core network AMF as described in step S405, the core network AMF can be notified which method is used, and the AMF forwards the message to the multicast service serving center, so that the multicast service serving center adopts a suitable synchronization protocol. The CU-CP can also notify the DU which method to adopt, for example, in step S602 or step S604, to notify the DU which synchronization protocol to be adopted.

Therefore, according to the embodiment of the present disclosure, the DU directly accesses the multicast group, so that the extra overhead of multicast data transmission can be avoided or reduced, the utilization efficiency of access network resources and/or air interface resources can be improved, and transmission delay can be reduced.

Embodiment 1.2

Figure 7:
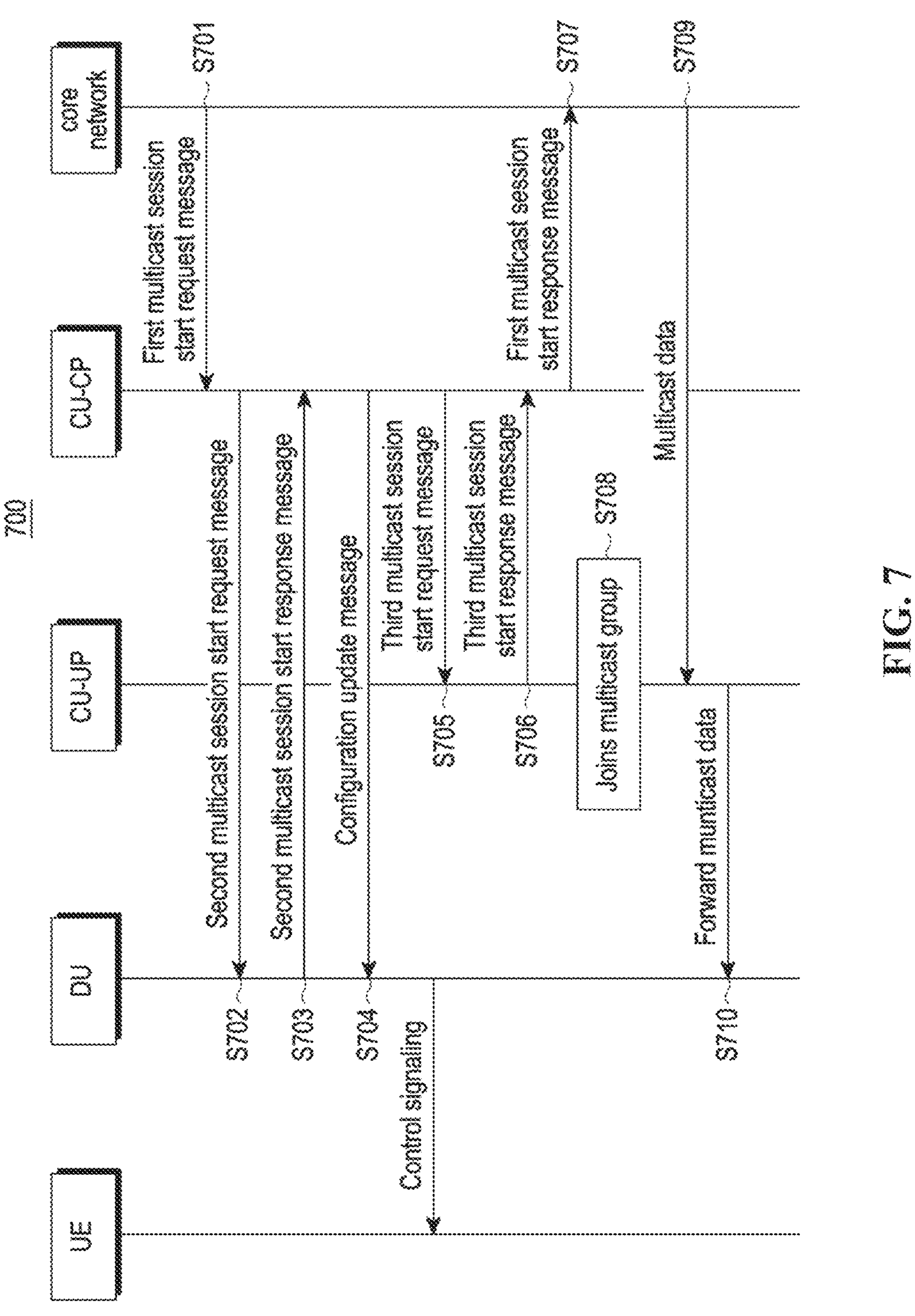
FIG. 7 illustrates a signal flow diagram of an exemplary method for transmitting data in a wireless communication system according to a second embodiment of the first scheme of the present disclosure.

FIG. 7 illustrates a signal flow diagram of an exemplary method 700 for transmitting data in a wireless communication system according to a second embodiment of the first scheme of the present disclosure. Those skilled in the art should understand that, in order to simplify the description, FIG. 7 only shows the steps related to the present disclosure. Steps S701 to S704 in FIG. 7 are similar to steps S601 to S604 in FIG. 6.

In FIG. 7, in step S701, the core network transmits a first multicast session start request message to the CU-CP.

Similar to Embodiment 1.1, here, the core network refers to the entity of the control plane in the core network, for example, the entity AMF responsible for mobility management or the control entity of multicast services. However, the embodiments of the present disclosure are not limited to this, and those skilled in the art can also use any other suitable entities.

When the entity in the core network receives the service start request transmitted by the multicast service serving center, the entity in the core network transmits the first multicast session start request message to the CU-CP. The first multicast session start request message may include a service identification of multicast, for example, to identify that the multicast service is an multimedia broadcast multicast service (MBMS) service. The first multicast session start request message may also include the service identification TMGI.

In addition, the first multicast session start request message may also include information such as the quality requirements of the multicast service (QoS information), the service scope of the multicast service or the like, and may also include the identification of packet data unit session (PDU Session) of the unicast service corresponding to the multicast service, information of quality flow (QoS flow) included in PDU Session. The information of QoS flow includes the identification of QoS flow and quality requirements of QoS flow (QoS information). The first multicast session start request message may also include when the multicast data starts to be transmitted, the information of the multicast group (IP multicast) and the downlink tunnel identification, the information of the multicast group includes, for example, the multicast address and source address of the multicast group or the like.

When the core network transmits data to the multicast group, the header includes the information of the multicast group and the downlink tunnel identification.

In step S702, the CU-CP transmits a second multicast session start request message to the DU.

The control plane (CU-CP) of an access network determines the multicast transmission mode. For example, CU-CP may initiate a user statistics process and determine whether to use the multicast mode to transmit data of multicast service according to the number of users who need to receive multicast services. The multicast mode can be further divided into multi-cell synchronization transmission and single-cell multicast transmission.

The multi-cell synchronization transmission refers to a case where there are users who want to receive multicast services in multiple consecutive cells, so the CU-CP can determine to use the same resources in multiple cells and transmit the same multicast data at the same time. In this way, user can receive data uninterruptedly when moving in these cells, and users at the edge of the cell can use signal superposition to receive multicast data better. For example, the MBSFN method in LTE is a method of multi-cell synchronization transmission.

The single-cell multicast transmission refers to transmitting multicast data asynchronously in different cells, for example, using different air interface resources and different transmitting times to transmit multicast data.

Different multicast modes require different information carried in the user plane. CU-CP determines the multicast mode, and the multicast mode includes multi-DU multi-cell multicast, single-DU multi-cell multicast, single-cell multicast and unicast bearer. The specific explanation is as follows.

(1) Multi-DU multi-cell multicast, that is, different multicast of multi-cell under multiple DUs, which requires the use of a synchronization protocol, and a synchronization header being added by the multicast service serving center for the multicast data, wherein the synchronization header includes a timestamp. When receiving the timestamp, different DUs synchronously transmit data to the UE according to the time indicated by the timestamp. The timestamp is based on a synchronization time reference and synchronization cycle, and the synchronization time reference and synchronization cycle are pre-configured by both the multicast service serving center and the DU. At this time, the multicast service serving center needs to add a synchronization header, and the DU needs to transmit data to the UE according to the information of the synchronization header. The CU-CP transmits the second multicast session start request to the distribution unit DU.

(2) Single-DU multi-cell multicast and single-cell multicast, the former is synchronization multicast of multi-cell under one DU. The core network transmits multicast data to a certain DU through a user plane path, so it is not required synchronization among DUs nor to add a timestamp for multicast data, thus it is not required to use the same synchronization protocol as multi-DU multicast. However, it is required to use a simple user-plane protocol, for example including a sequence number. A new user plane protocol layer or a new synchronization protocol type can be defined, and the new user plane protocol layer or a new synchronization protocol type includes the sequence number of the data. At this time, the multicast service serving center needs to add new header information according to the new user plane protocol layer or the new synchronization protocol type, while the DU transmits data to the UE according to its own configuration information and the sequence number in the header information. The CU-CP transmits the second multicast session start request to the distribution unit DU.

(3) Unicast bearer. When the CU-CP determines to adopt unicast bearer, it transmits a unicast request to the core network.

The second multicast session start request message may be a single message, including the service identification of the multicast, the information of the multicast group (IP multicast) and the downlink tunnel identification, wherein the information of the multicast group may include the multicast address and source address of the multicast group. In addition, the second multicast session start request message may also include an indication of the transmission mode to indicate one of the aforementioned multi-DU multi-cell multicast, single-DU multi-cell multicast, the multicast and the unicast bearer. Alternatively, the second multicast session start request message may also include indication information of the synchronization protocol, indicating whether to use the synchronization protocol, or indicating whether to use the synchronization protocol or a new user plane protocol, or indicating the type of the synchronization protocol.

In step S703, the DU transmits a second multicast session start response message to the CU-CP in response to the second multicast session start request message.

If the multicast service is transmitted in a tunnel manner, the second multicast session start response message includes the multicast service identification and the tunnel identification assigned by the DU for the multicast. The tunnel identification includes the IP address and the tunnel number.

The advantage of receiving data of multicast service in a tunnel manner is that it is simple and satisfies the basic requirements. If there is no need to perform multi-cell synchronization transmission among different DUs, the tunnel header information defined by the tunnel protocol can be used in a tunnel manner, which can reduce the information of the control header needed to be increased by the user plane.

In step S704, the CU-CP transmits a configuration update message to the DU.

When the CU-CP receives the first multicast session start request message, the CU-CP needs to notify the UE of the start of the multicast service and the wireless data channel configuration information of the multicast service. The CU-CP transmits a configuration update message to the DU, one objective of which is to notify the DU to transmit a multicast notification message to the UE, and the other objective of which is to transmit the wireless data channel configuration information of the multicast to the DU. The DU transmits the wireless data channel configuration information of multicast to the UE an the multicast control channel (such as the MCCH channel), so that the UE can perform channel configuration according to the wireless data channel configuration information, and can receive multicast data on the wireless data channel thereafter. The configuration update message is a common message, CU configuration update message of the current F1 interface or downlink common RRC transmission can be reused, or a new F1 message can be defined.

When receiving the multicast services, the UE may be in any state. If the UE is in idle mode, the UE does not always receive cell signaling. Therefore, firstly, the DU needs to transmit a multicast notification message to the UE in order to wake up the UE, and then the UE receives the information on the multicast control channel.

The CU-CP transmits a configuration update message to the DU to notify the DU to generate multicast notification message on air interface and transmit it to the UE. After receiving the configuration update message transmitted by the CU-CP, the DU needs to transmit a multicast notification message to the UE. The multicast notification message may only include limited information, for example, it only notifies the cell that there is a multicast service about to start, but does not notify the identification of the specific service. After receiving the multicast notification message, the UE receives complete multicast information on the multicast control channel, including service identification, wireless data channel configuration information corresponding to the multicast, and so on.

In one example, the configuration update message includes one or more of the following information.

Synchronization area identification. It can be the identification of a group of cells. These cells use the wireless data channel configuration included in the message in step S404 to transmit multicast services. Or it can be an identification of a specific area, such as a multicast synchronization area (MBSFN) identification.

Multicast control channel update time. The configuration information of the wireless data channel corresponding to the multicast service is transmitted by the DU to the UE at this time. The update time may be the sequence number of a certain cycle or the sequence number of the cell synchronization subframe SFN.

Service identification of multicast, for example, TMGI.

Wireless data channel configuration information, which is the wireless data channel configuration information corresponding to the multicast service. It may include physical layer multicast channel information, for example, subframe configuration, scheduling information, multicast service identification transmitted on the channel, and information of corresponding logical channel and so on.

Indication of transmission mode. As described in step S402, the CU-CP determines the transmission mode, and the configuration update message may include an indication of the transmission mode to indicate one of the multi-DU multi-cell multicast, single-DU multi-cell multicast, single-cell multicast, and unicast bearer.

Indication information of the synchronization protocol, to indicate whether to use the synchronization protocol, or to indicate whether to use the synchronization protocol or a new user plane protocol, or to indicate the type of the synchronization protocol.

The DU may parse the configuration update message, obtain and save the information included in the configuration update message. When the DU obtains the multicast control channel update time, the DU needs to transmit the multicast notification message to the UE at least one cycle before the multicast control channel update time. The DU saves the multicast identification and the wireless channel configuration information corresponding to the multicast, to be used for subsequent multicast data transmission.

The DU parses the configuration update message and transmits a multicast notification message to the UE according to the configuration update message, thereby reducing the signaling interaction between the DU and the CU-CP.

It should be noted that, similar to FIG. 6, the information transmitted in step S702 and step S704 can be transmitted by a message and executed before step S703. That is, the second multicast session start request may include a configuration update message. In other words, the second multicast session start request may include one or more of the following information.

Synchronization area identification, which can be the identification of a group of cells. These cells use the wireless data channel configuration included in the message to transmit multicast services.

Multicast control channel update time. The configuration information of the wireless data channel corresponding to the multicast service is transmitted by the DU to the UE at this time. The update time may be the sequence number of a certain cycle, or the sequence number of the cell synchronization subframe SFN.

Service identification of multicast, for example, TMGI,

Wireless data channel configuration information. It is wireless data charnel configuration information corresponding to the multicast service, and may include physical layer multicast channel information, for example, subframe configuration, scheduling information, multicast service identification transmitted on the channel, and information of corresponding logical channel and so on.

Multicast address and multicast source address corresponding to the multicast.

GTP downlink tunnel identification, which is used for multicast data transmission between the core network and the DU.

Indication of the transmission mode to indicate one of multi-DU multi-cell multicast, single-DU multi-cell multicast, single-cell multicast, and unicast bearer.

Indication information of the synchronization protocol, to indicate whether to use the synchronization protocol, or to indicate whether to use the synchronization protocol or a new user plane protocol, or to indicate the type of the synchronization protocol.

After receiving the multicast address and the multicast source address corresponding to the multicast, the DU can join the multicast group indicated by the multicast address and the multicast source address, and multicast data is received in IP multicast manner. When the DU receives the multicast control channel update time, the DU needs to transmit a multicast notification message for the multicast to the UE at least one cycle before the update time. The multicast notification message is illustrated in FIG. 7 as a control signaling.

In step S705, the CU-CP transmits a third multicast session start request message to the user plane (CU-UP) of access network.

The third multicast session start request message may include information such as the service identification TMGI, quality requirements of the multicast service (QoS information), the service scope of the multicast service or the like. In addition, the third multicast session start request message may also include the identification of the packet data unit session (PDU Sessions) of the unicast service corresponding to the multicast service, information of quality flow (QoS flow) included in PDU Session. The information of QoS flow can include the identification of QoS flow and quality requirements of QoS flow (QoS information).

In addition, the third multicast session start request message may also include when the multicast data starts to be transmitted, information of the multicast group (IP multicast), and a downlink tunnel identification. The third multicast session start request message may also include an indication of a transmission mode, or may also include indication information of a synchronization protocol.

In step S706, the CU-UP transmits a third multicast session start response message to the CU-CP, and the third multicast session start response message is in response to the third multicast session start request message.

In step S707, the CU-CP transmits a first multicast session start response message to the core network, and the first multicast session start response message responds to the first multicast session start request message.

The CU-CP reports the response message of the service establishment request to the core network. If multicast data is transmitted in a tunnel manner, the CU-CP transmits the tunnel identification assigned by the DU for the multicast service to the core network. The first multicast session start response message may include tunnel identification assigned by multiple DUs, so that the user plane of the core network may transmit multicast data to the tunnel indicated by the tunnel identification. The first multicast session start response message may also include an indication of the transmission mode to indicate one of multi-DU multi-cell multicast, single-DU multi-cell multicast, multicast, and unicast bearer. Indication information of the synchronization protocol may also be included to indicate whether to use the synchronization protocol, or to indicate whether to use the synchronization protocol or a new user plane protocol, or to indicate the type of the synchronization protocol.

The core network and the DU adopt the same user plane protocol, and the CU-CP determines which user plane protocol to use, and notify the same to the core network.

In step S708, the CU-UP joins the multicast group.

Different from the method 600 in FIG. 6, in this embodiment, after the third multicast session start request message is received in step S705, according to information on the multicast included in the third multicast session start request message, that is, a multicast address and a multicast source address, CU-UP joins the multicast group indicated by the multicast address and the multicast source address.

The CU-UP joins the multicast group so that both the multicast bearer and the unicast bearer go through the CU-UP, thereby reducing signaling interaction when the channel is transitioned.

In step S709, the core network transmits multicast data to the CU-UP in an IP multicast (IP multicast) manner.

In step S710, the CU-UP forwards the multicast data to the DU. After receiving the data, the DU transmits the multicast data to the UE on the wireless data channel corresponding to the multicast.

According to this embodiment, if the CU-UP directly joins the multicast group and it is not required to perform synchronization transmission of multi-cell on different DUs, a simple user plane protocol can be adopted for the user plane between the core network and the CU-UP. A simplified version of the synchronization protocol can be defined. In the core network, the simplified version of the synchronization protocol terminates at the core network node or the multicast service server, while in the access network, the simplified version of the synchronization protocol terminates at CU-UP or DU. Data can be transmitted between CU-UP and DU through a tunnel. The synchronization protocol adds synchronization header information to the data, and the synchronization header information can include the sequence number of the data.

On the other hand, if it is required to perform synchronization transmission of multi-cell on different DUs, the currently defined synchronization protocol can be used. The access network CU-CP determine which method is adopted, and when transmitting a message to the core network AMF, for example, as described in step S707, the core network AMF may be notified of which method to adopt. It is forwarded to the multicast service serving center by the AMF, and the multicast service serving center determines to adopt a suitable synchronization protocol.

Those skilled in the art should understand that although FIG. 7 shows the case where only the CU-CP joins the multicast group, both DU and CU-UP can join the multicast group.

Scheme Two

Figure 8:
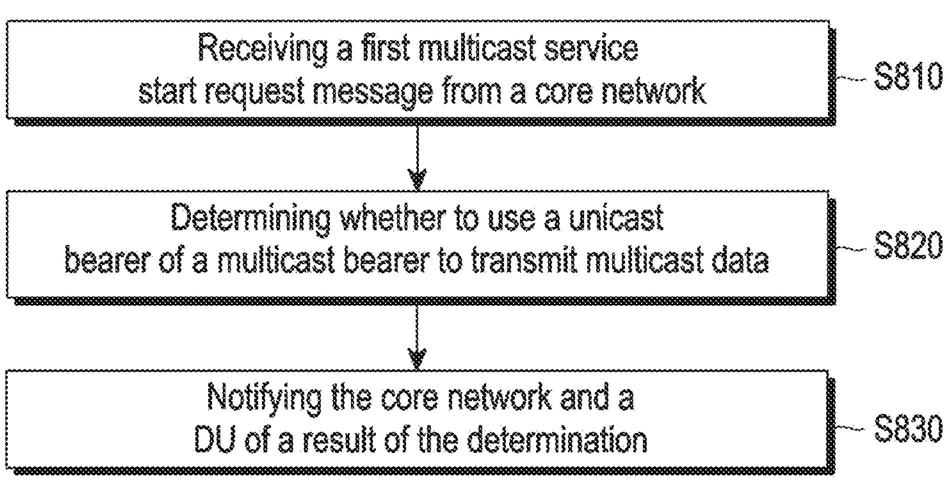
FIG. 8 is a flowchart illustrating an exemplary method for transmitting data in a wireless communication system according to the second scheme of the present disclosure.

FIG. 8 is a flowchart illustrating an exemplary method 800 for transmitting data in a wireless communication system according to the second aspect of the present disclosure. In one example, the method 800 may be implemented in the control plane (CP) of the access network at the access network side.

As shown in FIG. 8, in step S810, the CP of the access network receives a first multicast session start request message from the core network.

The first multicast session start request message includes a multicast service identification, and may also include identification (ID) of a packet data unit session (PDU Session) corresponding to the multicast service.

In step S820, the CP of the access network determines whether to use a unicast bearer or a multicast bearer to transmit the multicast data.

In step S830, the CP of access network notifies the core network and the distribution unit DU of the determination result.

In one example, when the core network receives the determination result transmitted by the CP of the access network, if the determination result indicates a unicast bearer or includes a message requesting unicast bearer establishment, the core network initiates a unicast bearer establishment process. To reduce data loss, unicast bearers can also be established in advance.

During the unicast bearer establishment process, the relationship between the PDU session ID of the unicast bearer and the multicast service can be notified.

In addition, if the determination result indicates a multicast bearer, the core network transmits multicast data on the multicast bearer.

Thereafter, the DU can receive multicast data on the corresponding bearer based on the determination result.

In an example, the CU-CP notifies the DU of the determination result to indicate whether to establish a unicast bearer or a multicast bearer to transmit data, so that the DU receives the multicast data on the corresponding user plane and transmits the corresponding air interface message.

The method 800 may be executed after the multicast service is started, for example, according to the method 300 in FIG. 3, but the present disclosure is not limited thereto.

According to the embodiment of the present disclosure, when the transmission mode of the multicast data is transitioned, data loss can be reduced, and the delay caused by the transition of the transmission mode can be reduced. In addition, control plane CP of the access network determines whether to use unicast bearer or multicast bearer to transmit data, and the transition is more timely, which reduces the impact on the core network.

Hereinafter, detailed embodiments of the second scheme of the present disclosure will be described in detail with reference to the accompanying drawings.

Embodiment 2.1

Figure 9:
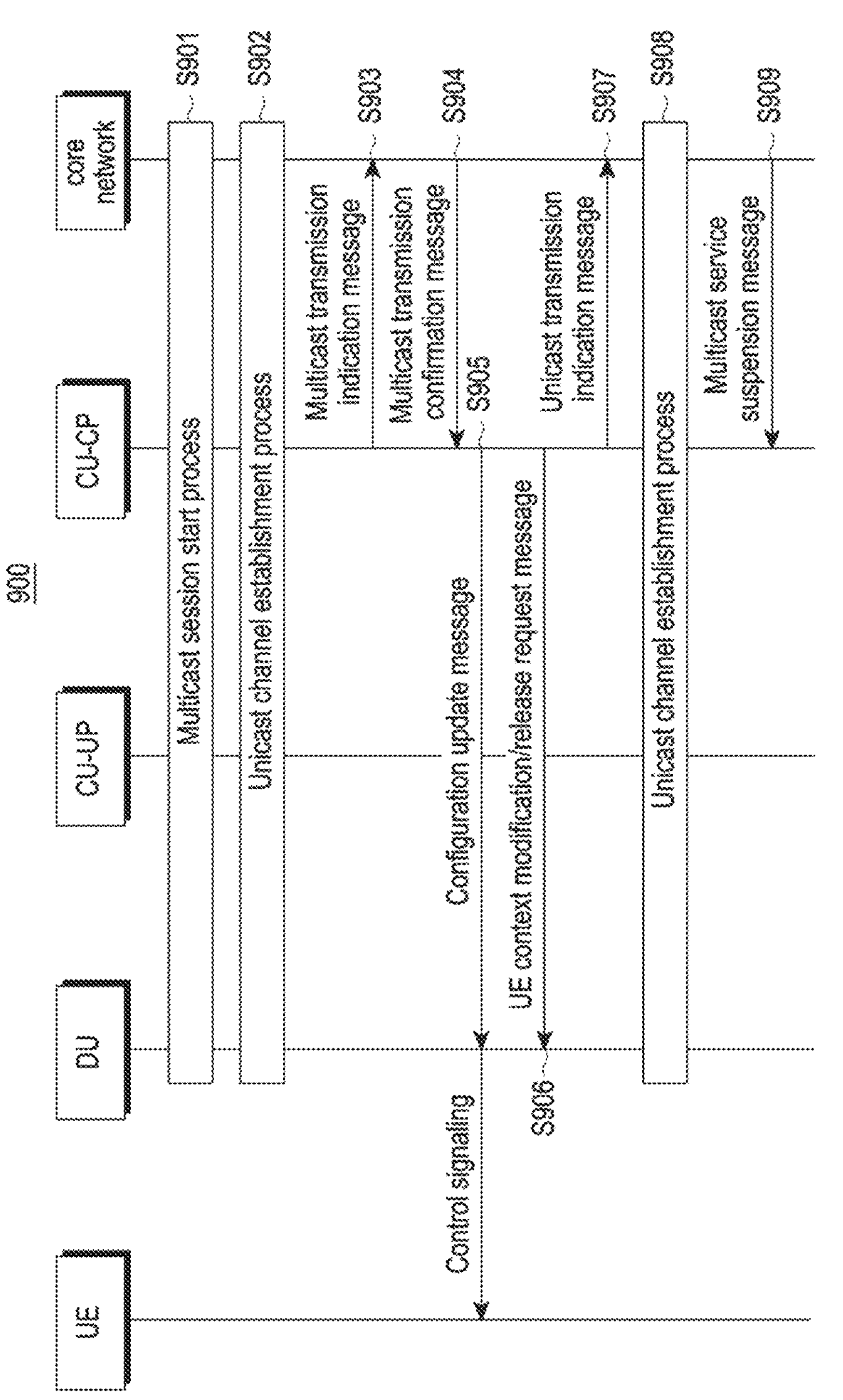
FIG. 9 illustrates a signal flow diagram of an exemplary method for transmitting data in a wireless communication system according to the first embodiment of the second scheme of the present disclosure.

FIG. 9 illustrates a signal flow diagram of an exemplary method 900 for transmitting data in a wireless communication system according to the first embodiment of the second scheme of the present disclosure. Those skilled in the art should understand that, in order to simplify the description, FIG. 9 only shows the steps related to the present disclosure.

The signal flow diagram in FIG. 9 shows the transition process between point-to-point transmission and point-to-multipoint transmission. The process involves the control plane (CP) of access network but does not involve the user plane (UP) of the access network.

In step S901, the core network initiates a multicast session start process.

The multicast session start process may include multiple steps, for example, may include the steps described with reference to FIG. 6 or FIG. 7.

According to Embodiment 2.1, the first multicast session start request message may also include indication information on whether data is transmitted. The core network knows the number of users who want to receive multicast services through application-layer statistics, and initially determines to transmit multicast services through unicast bearers, that is, point-to-point channels.

The core network may establish both the multicast transmission channel and the unicast transmission channel at the beginning of the service, which can reduce the data loss and delay caused when the multicast transmission mode is transitioned.

The core network transmits a multicast session start request message, for example the first multicast session start request message, to the CU-CP, and the information included in the first multicast session start request message is as described above with reference to steps S401 and S501.

In addition, the first multicast session start request message may also include a data transmission suspension indication, so that the core network may notify the CU-CP that the multicast service channel is established through the first multicast session start request message, but the data transmission is suspended, that is, the data transmission is temporarily suspended and will be activated later.

If the first multicast session start request message does not include a data transmission suspension indication, the CU-CP may perform operations according to the steps in FIG. 6 or FIG. 7. On the other hand, if the first multicast session start request message includes a data transmission suspension indication, the CU-CP may notify the DU that the multicast service is started, but the wireless data channel corresponding to the multicast is not configured, and then the DU joins the multicast group.

In step S902, the core network initiates a multicast service unicast channel establishment process.

The unicast channel establishment process of the multicast service is similar to the current PDU Session establishment process, the difference therebetween is that the PDU Session establishment request message can indicate the relationship between the PDU session and the multicast service, for example, by including the PDU Session ID and the corresponding multicast service identification to indicate their relationship. The remaining steps and information of these two processes are basically similar, thus the repeat description will be omitted.

In one example, a relationship between the PDU session and the multicast service may also be indicated during the start process of the multicast service in step S901, that is, a relationship indication information of the PDU session and the multicast service, that is, the multicast service identification and the corresponding PDU Session ID, is included in the first multicast session start request message. In this way, preferably, one multicast service corresponds to one PDU Session ID.

In step S903, the CU-CP transmits a multicast transmission indication message to the core network.

The CU-CP determines whether to use a unicast bearer or a multicast bearer to transmit multicast data.

In one example, in the process of transmitting multicast data on the unicast channel, the CU-CP may know the number of users receiving the multicast service according to the PDU session ID, based on the indication information of the relationship between the multicast service and the PDU Session. When the number of users exceeds a predetermined threshold, CU-CP can determine to adopt the multicast mode. The CU-CP notifies the core network of the determination result, for example, transmits a message to the AMF to indicate that it is needed to adopt the multicast mode to transmit the multicast service data. The message may be a common message and at least includes the identification of the multicast service. The AMF transmits a message indicating the multicast mode to the multicast service serving center, and the multicast service serving center transmits a response message to the AMF, for example, transmit a multicast transmission confirmation message to the core network, to notify that the multicast service data is now being transmitted in the multicast mode.

In step S904, the core network transmits a multicast transmission confirmation message to the CU-CP. Through the multicast transmission confirmation message, the core network notifies the CU-CP that the multicast service data is now being transmitted in the multicast mode.

In step S905, the CU-CP transmits a configuration update message to the DU.

The CU-CP notifies the DU of the determination result to indicate the DU to start using the multicast bearer to transmit multicast data.

In one example, the determination result transmitted to the DU may include a configuration update message. The specific content of the configuration update message may be similar to that described with reference to steps S404 and S504, and will not be repeated here.

As mentioned above, after receiving the configuration update message, the DU transmits a multicast notification message to the UE, which includes the wireless data channel configuration information. The UE configures the multicast channel according to this configuration update message, and can receive multicast data on the multicast channel thereafter.

Here, although it is shown that step S905 is performed after step S903, these two steps can also be performed in other orders, for example, steps S903 and S905 can be performed in parallel.

In step S906, the CU-CP transmits a UE context modification request message or a UE context release request message to the DU, to suspend the unicast bearer.

For each user who previously used the unicast bearer to receive multicast services, the CU-CP may configure the user to be in a RRC-inactive (deactivated) state or an Idle (idle) state. When configured to be in the RRC-inactive state, the CU-CP transmits a UE context modification request message to indicate the DU to suspend the unicast bearer. If the unicast bearer needs to be used to receive services afterwards, this can activate the unicast bearer as soon as possible.

In the case of being configured in the Idle state, the CU-CP transmits a UE context release request message to the DU.

Afterwards, the DU that receives the UE context modification request message or the UE context release request message transmits a response message to the CU-CP.

Afterwards, in the process of transmitting multicast data, the CU-CP may obtain the number of users receiving multicast services using multicast bearers in each cell, for example, through a statistical process. When the user data is reduced below the predetermined threshold, the CU-CP may determine that the unicast bearer is used to transmit the multicast data. Therefore, the CU-CP transmits a message to notify the core network to establish a unicast channel.

In step S907, the CU-CP transmits a unicast transmission indication message to the core network.

In one example, the CU-CP transmits a unicast channel establishment notification message to the core network to notify the unicast channel establishment.

There are two ways to notify.

The CU-CP may transmit a UE-specific unicast channel establishment notification message to the core network, for example AMF, for each UE, and the UE-specific unicast channel establishment notification message includes the UE's identification on the NG interface, session identification and multicast service identification. AMF forwards the UE-specific unicast channel establishment notification message to the multicast service serving center.

The CU-CP may transmit a common unicast channel establishment notification message to the core network, for example AMF, and the common unicast channel establishment notification message includes the identification of the cell and the identification of the users who need to receive the multicast service in the cell. The user's identification may be a unique user identification in a cell, a unique user identification in a base station, or a temporary identification assigned by the core network AMF to the UE, for example 5G-TMSI. According to the identification, the AMF can find the user's permanent identification IMSI, or temporary identification 5G-TMSI.

In step S908, the core network initiates the unicast channel establishment process. The establishment process can adopt the current establishment process. The difference is that the PDU session establishment request message can include indication information of the relationship between the PDU session and the multicast service. If the UE is configured to be in the Idle state, the CU-CP transmits a paging process so that the UE enters the connected state.

Alternatively, if the CU-CP previously configures the UE to be in the RRC-inactive state, the CU-CP may transmit a paging process to make the UE enter the RRC connected state.

In step S909, the core network transmits a multicast service suspension message to the CU-CP.

After the unicast channels of all UEs are established, the core network transmits a multicast service suspension message to the CU-CP. Furthermore, the CU-CP can transmit a multicast suspension configuration update message to the DU, stop transmitting data on the multicast channel on the air interface, delete the configuration of the multicast channel on the DU, and the DU will no longer broadcast the control information of the multicast on the air interface.

Embodiment 2.2

Figure 10:
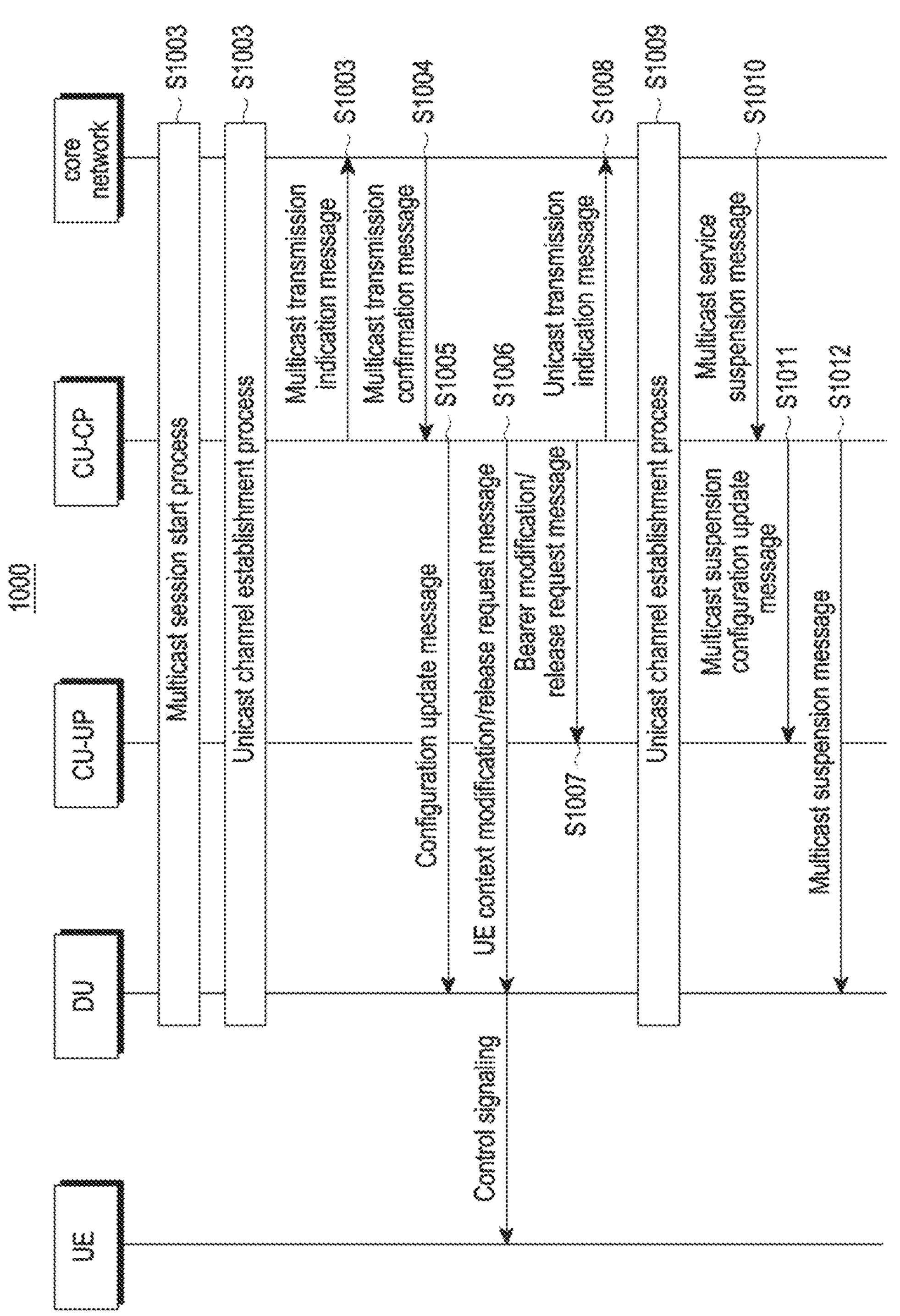
FIG. 10 illustrates a signal flow diagram of an exemplary method for transmitting data in a wireless communication system according to a second embodiment of the second scheme of the present disclosure.

FIG. 10 illustrates a signal flow diagram of an exemplary method 1000 for transmitting data in a wireless communication system according to a second embodiment of the second scheme of the present disclosure. Those skilled in the art should understand that, in order to simplify the description, FIG. 10 only shows the steps related to the present disclosure. In one example, the method 1000 may be implemented in a control plane (CP) of the access network at the access network side.

The signal flow diagram in FIG. 10 shows the transition process between point-to-point transmission and point-to-multipoint transmission. The process involves not only the control plane (CP) of the access network, but also the user plane (UP) of the access network.

In step S1001, the core network initiates a multicast session start process.

The multicast session start process may include multiple steps, for example, may include the steps described with reference to FIG. 6 or FIG. 7.

According to Embodiment 2.2, the first multicast session start request message may also include indication information on whether data is transmitted. The core network knows the number of users who want to receive multicast services through application-layer statistics, and initially determines to transmit multicast services through unicast bearers, that is, point-to-point channels, The core network may establish both the multicast transmission channel and the unicast transmission channel at the beginning of the service, which can reduce the data loss and delay caused when the multicast transmission mode is switched.

The core network transmits a multicast session start request message, for example a first multicast session start request message, to the CU-CP, and the information included in the first multicast session start request message is as described above with reference to steps S401 and S501.

In addition, the first multicast session start request message may also include a data transmission suspension indication, so that the core network can notify the CU-CP that the multicast service channel is established through the first multicast session start request message, but the data transmission is suspended, that is, the data transmission is temporarily suspended and will be active later.

If the first multicast session start request message does not include a data transmission suspension indication, the CU-CP may perform operations according to the steps in FIG. 6 or FIG. 7. On the other hand, if the first multicast session start request message includes a data transmission suspension indication, the CU-CP can notify the DU that the multicast service is started, but the wireless data channel corresponding to the multicast is not configured, and then the DU joins the multicast group.

In step S1002, the core network initiates a multicast service unicast channel establishment process.

The unicast channel establishment process of the multicast service is similar to the current PDU Session establishment process, the difference therebetween is that the PDU Session establishment request message can indicate the relationship between the PDU session and the multicast service, for example, by including the PDU Session ID and the corresponding multicast service identification to indicate their relationship. The remaining steps and information of these two processes are basically similar, thus the repeat description will be omitted.

In one example, the relationship between the PDU session and the multicast service may also be indicated during the start process of the multicast service in step S1001, that is, the indication information of the relationship between the PDU session and the multicast service, that is, the multicast service identification and the corresponding PDU Session ID, is included in the first multicast session start request message. In this way, preferably, one multicast service corresponds to one PDU Session ID.

In step S1003, the CU-CP transmits a multicast transmission indication message to the core network.

The CU-CP determines whether to use a unicast bearer or a multicast bearer to transmit multicast data.

In one example, in the process of transmitting multicast data on the unicast channel, the CU-CP may know the number of users receiving the multicast service according to the PDU session ID, based on the indication information of the relationship between the multicast service and the PDU session. When the number of users exceeds a predetermined threshold, the CU-CP can determine to adopt the multicast mode. The CU-CP notifies the core network of the determination result, for example, transmits a message to the AMF to indicate that it is needed to adopt the multicast mode to transmit the multicast service data. The message may be a common message and at least includes the identification of the multicast service. The AMF transmits a message indicating the multicast mode to the multicast service serving center, and the multicast service serving center transmits a response message to the AMF, for example, transmit a multicast transmission confirmation message to the core network, to notify that the multicast service data is now being transmitted in the multicast mode.

In step S1004, the core network transmits a multicast transmission confirmation message to the CU-CP. Through the multicast transmission confirmation message, the core network notifies the CU-CP that the multicast service data is now being transmitted in the multicast mode.

In step S1005, the CU-CP transmits a configuration update message to the DU.

The CU-CP notifies the DU of the determination result to instruct the DU to start using the multicast bearer to transmit multicast data.

In one example, the determination result transmitted to the DU may include a configuration update message. The specific content of the configuration update message may be similar to that described with reference to steps S404 and S504, and will not be repeated here.

As mentioned above, after receiving the configuration update message, the DU transmits a multicast notification message to the UE, which includes the wireless data channel configuration information. The UE configures the multicast channel according to this configuration update message, and can receive multicast data on the multicast channel thereafter.

Here, although it is shown thin step S1005 is performed after step S1003, these two steps can also be performed in other orders, for example, steps S1003 and S1005 can be performed in parallel.

In step S1006, the CU-CP transmits a UE context modification request message or a UE context release request message to the DU to suspend the unicast bearer.

For each user who previously used unicast bearer to receive the multicast services, the CU-CP may configure the user to be in the RRC-inactive (deactivated) state or the Idle (idle) state. When configured to be in the RRC-inactive state, the CU-CP transmits a UE context modification request message to indicate the DU to suspend the unicast bearer. If the unicast bearer needs to be used to receive services afterwards, this can activate the unicast bearer as soon as possible.

In the case of being configured in the Idle state, the CU-CP transmits a UE context release request message to the DU.

After that, the DU that receives the UE context modification request message or the UE context release request message transmits a response message to the CU-CP.

In step S1007, the CU-CP transmits a bearer modification request message or a bearer release request message to the CU-UP.

Similarly, when the user is configured to be in the RRC-inactive state, the CU-CP transmits a bearer modification request message to the CU-UP to suspend the unicast bearer. When the user is configured to be in the Idle state, the CU-CP transmits a bearer release request message to the CU-UP.

The CU-UP that receives the bearer modification request message or the bearer release request message transmits a response message to the CU-CP.

Afterwards, as mentioned above, in the process of transmitting multicast data, the CU-CP may obtain the number of users receiving multicast services using multicast bearers in each cell, for example, through a statistical process. When the user data is reduced below the predetermined threshold, the CU-CP can determine that the unicast bearer is used to transmit the multicast data. Therefore, the CU-CP transmits a message to notify the core network to establish a unicast channel.

In step S1008, the CU-CP transmits a unicast transmission indication message to the core network.

In an example, the CU-CP transmits a unicast channel establishment notification message to the core network to notify the establishment of the unicast channel.

There are two ways to notify.

The CU-CP may transmit a UE-specific unicast channel establishment notification message to the core network, for example AMF, for each UE, and the UE-specific unicast channel establishment notification message includes the UE's identification on the NG interface, session identification and multicast service identification. AMF forwards the UE-specific unicast channel establishment notification message to the multicast service serving center.

The CU-CP may transmit a common unicast channel establishment notification message to the core network, for example AMF, and the common unicast channel establishment notification message includes the identification of the cell and the identification of the users who need to receive the multicast service in the cell. The user's identification may be a unique user identification in a cell, a unique user identification in a base station, or a temporary identification assigned by the core network AMF to the UE, for example 5G-TMSI. According to the identification, the AMF can find the user's permanent identification IMSI, or temporary identification 5G-TMSI.

In step S1009, the core network initiates the unicast channel establishment process.

The establishment process may adopt the current establishment process. The difference is that the PDU Session establishment request message can include indication information of the relationship between the PDU session and the multicast service. If the UE is configured to be in the Idle state, the CU-CP transmits a paging process so that the UE enters the connected state.

Alternatively, if the CU-CP previously configured the UE to be in the RRC-inactive state, the CU-CP may transmit a paging process to make the UE enter the RRC connected state.

In step S1010, the core network transmits a multicast service suspension message to the CU-CP.

After the unicast channels of all UEs are established, the core network transmits a multicast service suspension message to the CU-CP.

In step S1011, the CU-CP transmits a multicast suspension configuration update message to the DU, stops transmitting data on the multicast channel on the air interface, deletes the configuration of the multicast channel on the DU, and the DU will no longer broadcasts the control information of the multicast on the air interface.

In step S1012, the CU-CP transmits a multicast suspension message to the CU-UP. CU-UP is notified that data transmission of multicast service data is paused.

Therefore, according to the embodiment of the present disclosure, control plane CP of the access network determines whether to use a unicast bearer or a multicast bearer to transmit data, and the transition is more timely, which reduces the impact on the core network.

Scheme Three

Figure 11:
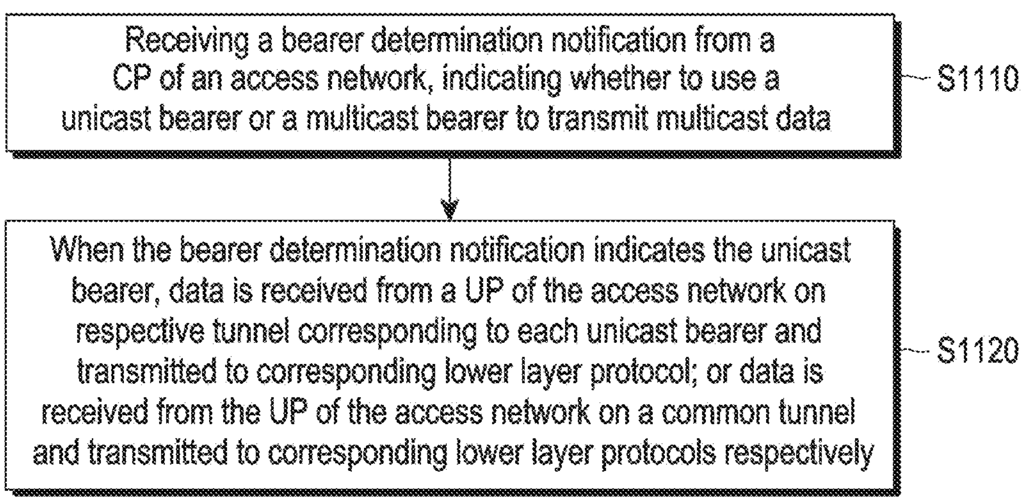
FIG. 11 is a flowchart illustrating an exemplary method for transmitting data in a wireless communication system according to the third scheme of the present disclosure.

FIG. 11 is a flowchart illustrating an exemplary method 1100 for transmitting data in a wireless communication system according to the third scheme of the present disclosure. In an example, the method 1100 can be implemented in a user plane (UP) of the access network at the access network side.

As shown in FIG. 11, in step S1110, The UP of the access network receives a bearer determination notification from a control plane (CP) of the access network, and the bearer determination notification indicates whether to use a unicast bearer or a multicast bearer to transmit multicast data. In step S1120, when the bearer determination notification indicates a unicast bearer, the data is received from the UP of the access network on the respective tunnel corresponding to each unicast bearer and transmitted to the corresponding lower layer protocol; or the data is received from the UP of the access network on the common tunnel and transmitted to the corresponding lower layer protocols respectively.

In one example, when the CP of the access network determines that it is a unicast bearer, if the UP of access network maps the data received from the core network to the respective higher layer protocol corresponding to each unicast bearer, the data is transmitted to the DU through the tunnel. If the UP of the access network maps the data received from the core network to a common higher layer protocol, the data is transmitted to the DU through a tunnel among the different tunnels.

On the other hand, when the CP of access network determines that it is a multicast bearer, the UP of access network maps the data received from the core network to a synchronization layer or to a distribution layer. However, the synchronization layer or the distribution layer forwards the data to the DU, instead of processing the data packets.

Figure 12:
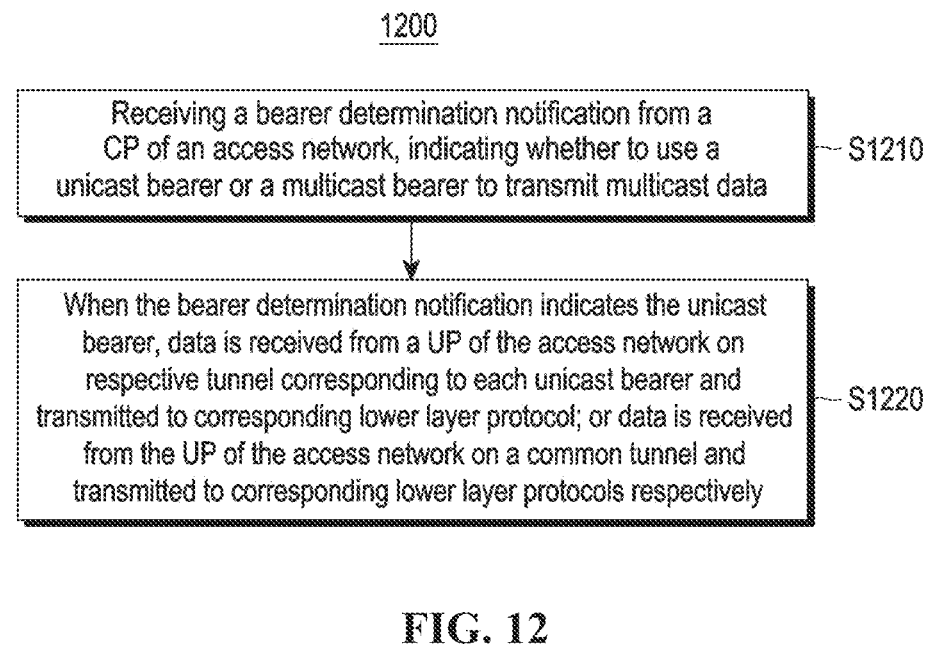

FIG. 12 is a flowchart illustrating another exemplary method 1200 for transmitting data in a wireless communication system according to the third scheme of the present disclosure. In one example, the method 1200 may be implemented in a user plane (UP) of the access network at the access network side.

As shown in FIG. 12, in step S1210, The UP of the access network receives a bearer determination notification from the control plane (CP) of the access network. The bearer determination notification indicates whether to use a unicast bearer or a multicast bearer to transmit multicast data. In step S1220, when the bearer determination notification indicates a unicast bearer, the data is received from the UP of the access network on the respective tunnel corresponding to each unicast bearer and transmitted to the corresponding lower layer protocol; or the data is received from the UP of the access network on the common tunnel and transmitted to the corresponding lower layer protocols respectively.

In one example, if it is the unicast bearer, the DU receives data from the CU-UP on the respective tunnel corresponding to each unicast bearer, and then transmits it to the corresponding lower layer protocol; or, the DU receives data from the CU-UP on the common tunnel, and then it to the lower layer protocol corresponding to unicast respectively. In an example, the DU transmits data to the UE in a unicast mode.

If it is a multicast bearer, the DU receives the data from the CU-UP on the tunnel corresponding to the multicast service, and then transmits it to the lower-layer protocol corresponding to the multicast. In one example, the DU transmits data to the UE through a multicast method.

Therefore, according to the embodiment of the present disclosure, a control plane (CP) of the access network determines whether to use a unicast bearer or a multicast bearer to transmit data, and the transition is more timely, which reduces the impact on the core network.

Embodiment 3.1

Figure 13:
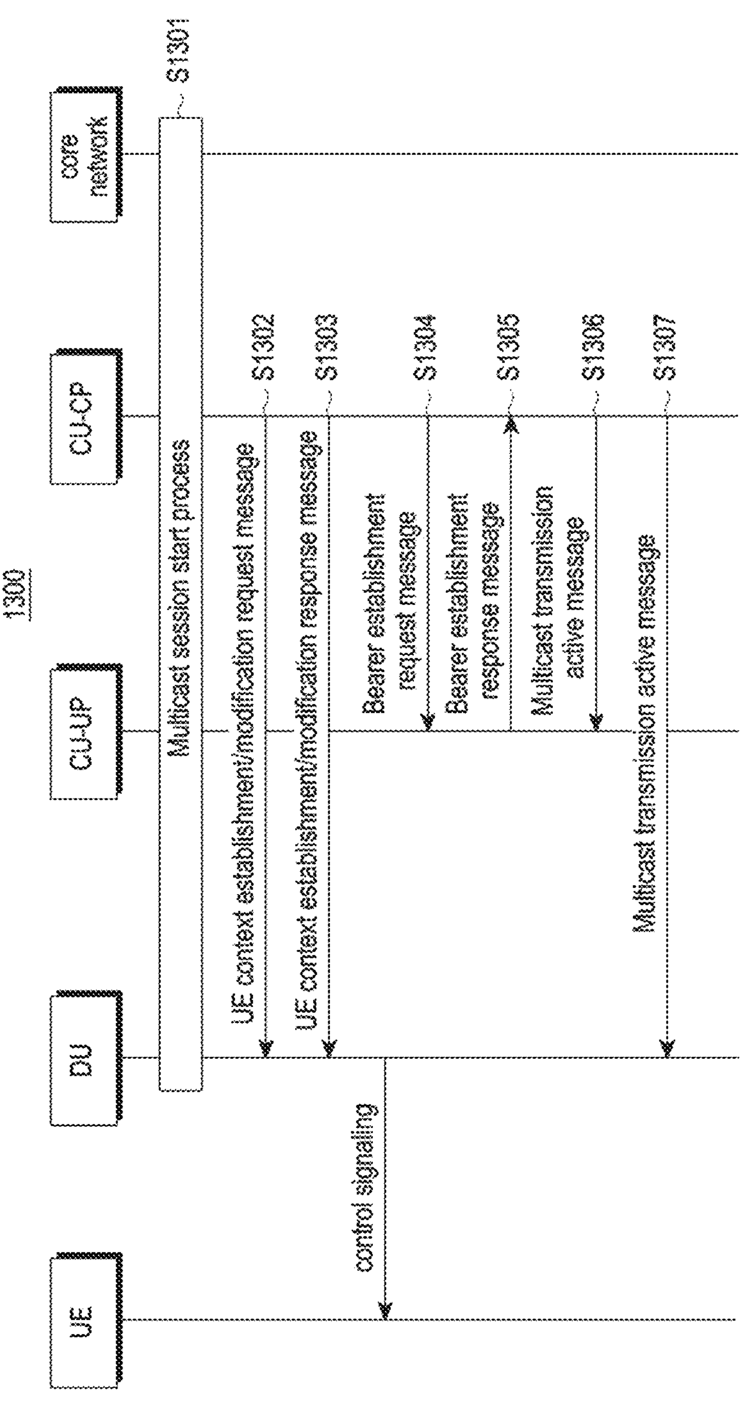
FIG. 13 illustrates a signal flow diagram of an exemplary method for transmitting data in a wireless communication system according to the first embodiment of the third scheme of the present disclosure.

FIG. 13 illustrates a signal flow diagram of an exemplary method 1300 for transmitting data in a wireless communication system according to the first embodiment of the third scheme of the present disclosure. Those skilled in the art should understand that, in order to simplify the description, FIG. 13 only shows the steps related to the present disclosure.

The signal flow diagram in FIG. 13 shows the transition process between point-to-point transmission and point-to-multipoint transmission, which involves the user plane (UP) of the access network.

In step S1301, the core network initiates a multicast session start process.

This process contains multiple steps, and can be similar to the service start process described with reference to FIGS. 6 and 7, the difference is in that in the first multicast service request message, the multicast service identification and the PDU session ID of a unicast bearer corresponding to multicast service can be included.

In step S1302, the CU-CP transmits a UE context establishment request message or a UE context modification request message to the DU.

In the process of multicast data transmission, the CU-CP can obtain the number of users receiving multicast services using multicast bearers in each cell, for example, according to a statistical process. When the number of users is lower than the predetermined threshold, the CU-CP may determine to adopt unicast bearer. In this case, the CU-CP transmits a UE context establishment request message or a UE context modification request message to the DU to notify the lower layer protocol configuration for establishing a unicast channel, such as the configuration information of the RLC layer, MAC layer, and physical layer. The message includes the identification of the bearer (DRB ID), the service identification of the multicast service corresponding to the bearer (for example, TMGI), and the lower layer protocol configuration corresponding to the bearer.

In step S1303, the DU transmits a UE context establishment response message or a UE context modification response message to the CU-CP. The UE context establishment response message or the UE context modification response message includes the IP address and downlink TEID assigned by the DU for the unicast bearer.

In step S1304, the CU-CP transmits a bearer establishment request message or a bearer modification request message to the CU-UP.

The CU-CP transmits a bearer establishment request message or a bearer modification request message to the CU-UP to establish a unicast bearer to transmit multicast service data. The CU-CP can transmit the bearer establishment request message or bearer modification request message in the following two ways.

The CU-CP transmits a UE-specific bearer establishment request message or a bearer modification request message for each UE that wants to receive multicast services. The UE-specific bearer establishment request message or bearer modification request message includes the UE's identification on the CU-CP and CU-UP interfaces, the identification of unicast bearer DRB ID, the IP address and downlink TEID corresponding to the DRB, and service identification of the multicast service corresponding to the bearer (for example, TMGI), high-layer protocol configuration corresponding to the bearer (for example, configuration information of PDCP protocol, SDAP protocol), etc. Upon receiving the UE-specific bearer establishment request message or the bearer modification request message, the CU-UP establishes the PDCP or SDAP protocol corresponding to the unicast bearer. The tunnel used for downlink reception uses the same tunnel for the multicast bearer, that is, CU-UP receives multicast service data from one tunnel, and then divides the multicast service data into multiples and transmits them to the higher layer protocol of each unicast bearer respectively, for example transmit them to SDAP and PDCP.

The CU-CP uses common messages to transmit common bearer establishment request messages or bearer modification request messages to all of the UEs that want to receive multicast services. The common bearer establishment request message or the bearer modification request message includes information such as a group of UE IDs, a group of unicast bearer identification DRB IDs, the IP address and downlink TEID corresponding to the DRB, the identification of the multicast service (for example, TMGI), configuration information of the higher layer protocol and so on. For the same multicast service, all unicast bearers share a set of higher layer protocols. After receiving the public bearer establishment request message or bearer modification request message, CU-UP establishes a set of higher layer protocols for all unicast bearers, and a set of lower layer protocols for each unicast bearer on the DU. In other words, a SDAP and PDCP are established on the CU-UP, and the data processed by PDCP is transmitted to the DU from multiple tunnels, or transmitted to the DU from one tunnel. The DU copies the data and transmits it to the lower layer protocol corresponding to each unicast bearer.

In step S1305, the CU-UP transmits a bearer establishment response message or a bearer modification response message to the CU-CP.

In step S1306, the CU-CP transmits a multicast transmission active message to the CU-UP.

In the process of transmitting multicast service data through unicast channels, CU-CP counts the number of users who need to receive multicast services. If the number of users exceeds a predetermined threshold, CU-CP determines to use multicast bearer to transmit multicast services data. The CU-CP transmits a multicast transmission active message to notify the CU-UP to start transmitting data using the multicast bearer. There are two ways to notify.

The CU-CP may transmit a UE-specific multicast transmission active message to the CU-UP for each UE, the UE-specific multicast transmission active message includes the UE's identification on the Xn interface, the identification of PDU Session, and the identification of multicast service.

The CU-CP may transmit a common multicast transmission active message to the CU-UP. The common multicast transmission active message may include the cell identification and the identification of the user who needs to receive the multicast service in the cell. The user's identification may be a unique user identification in a cell, or a unique user identification in a base station, or a temporary identification assigned by the core network AMF to the UE, for example 5G-TMSI.

When CU-UP receives the multicast transmission active message in step S1306, it maps the multicast service data received from the core network to the synchronization (SYNC) layer or distribution layer corresponding to the multicast service, synchronization layer or the distribution layer forwards the data to the DU through the IP address and downlink TEID corresponding to the multicast service.

The IP address and downlink TEID corresponding to the multicast service are assigned by the DU, and are transmitted to the CU-UP during the start process of the multicast service.

In step S1307, the CU-CP transmits a multicast transmission active message to the DU.

The CU-CP determines to use the multicast channel to transmit multicast service data, and transmits a multicast transmission active message to notify the DU to start transmitting data through the multicast channel. There are two ways to notify.

The CU-CP may transmit a UE-specific multicast transmission active message to the DU for each UE. The UE-specific multicast transmission active message includes the UE's identification on F1 interface, identification of PDU session, and identification of multicast service.

The CU-CP may transmit a common multicast transmission active message to the DU. The common multicast transmission active message includes the identification of the cell and the identification of the users who need to receive the multicast service in the cell. The user's identification may be a unique user identification in a cell, or a unique user identification in a base station, or a temporary identification assigned to the UE by the core network AMF, for example 5G-TMSI.

The DU starts to receive data on the tunnel corresponding to the multicast bearer, and suspends the RLC/MAC of the unicast bearer corresponding to the UE.

Figure 14:
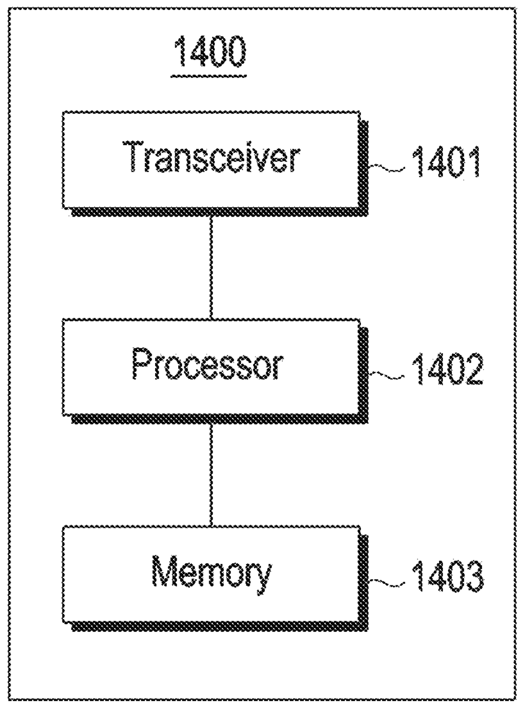
FIG. 14 illustrates a schematic block diagram of a device for transmitting data in a wireless communication network according to an embodiment of the present disclosure.

FIG. 14 illustrates a schematic block diagram of a device 1400 for transmitting data in a wireless communication network according to an embodiment of the present disclosure. The device 1400 may be implemented on the access network side. For example, the device 1400 may be implemented to perform one of the methods described above with reference to FIGS. 3, 4, 5, 8, 11 and 12.

As shown in FIG. 14, the device 1400 may include a transceiver 1401, a processor 1402, and a memory 1403.

The transceiver 1401 transmits and receives signals. The memory 1403 stores instructions that can be executed by the processor 1402, when executed by the processor 402, the instructions can cause the processor 1402 to execute one of the methods described above with reference to FIGS. 3, 4, 5, 8, 11 and 12.

The above are only specific embodiments of the present disclosure, but the protection scope of the present disclosure is not limited to this. Any person skilled in the art can easily think of changes or substitutions within the technical scope disclosed by the present disclosure, which should be covered within the protection scope of the present disclosure. Therefore, the protection scope of the present disclosure should be subject to the protection scope of the claims.

The invention claimed is:

1. A method for transmitting data in a wireless communication system by a anew generation-radio access network (NG-RAN) node, the method comprising:

receiving, from a core network (CN), a first request message including an identifier (ID) of a packet data unit (PDU) session and an ID related to a multicast service;

transmitting, to the CN, a second request message indicating, to the CN, to use a multicast for the multicast service; and transmitting, from a central unit-control plane (CU-CP) of the NG-RAN node to a distribution unit (DU) of the NG-RAN node, a third request message including the ID related to the multicast service, information about a radio data bearer configuration, and information about an area for the multicast service.

2. The method of claim 1, wherein the first request message further includes a data transmission suspension indication indicating whether data transmission is suspended, and wherein, before transmitting the first request message, a multicast transmission channel and a unicast transmission channel is established.

3. The method of claim 1, wherein the first message further includes a relationship indication information of the PDU session and the multicast service, and the method further comprises determining whether to use a unicast bearer or a multicast bearer to transmit multicast data by:

during transmitting the multicast data by using the unicast channel, determining to use the multicast bearer to transmit the multicast data based on the relationship indication information.

4. The method of claim 3, further comprises:

transmitting, from the CU-CP, a bearer modification request message or a bearer release request message to a user plane (UP) of the NG-RAN node to suspend the unicast bearer; and receiving, from the CU-CP, a response message from the UP of the NG-RAN node.

5. The method of claim 3, wherein determining whether to use the unicast bearer or the multicast bearer to transmit multicast data further comprises:

during transmitting the multicast data by using the multicast channel, counting a number of users in each cell who use the multicast channel to receive the multicast data; and determining to use the unicast bearer to transmit the multicast data when the number of the users is lower than a predetermined threshold.

6. An apparatus of a new generation-radio access network (NG-RAN) node for transmitting data in a wireless communication system, the apparatus comprising:

a transceiver; and a processor coupled to the transceiver and configured to;

receive, from a core network (CN), a first request message including an identifier (ID) of a packet data unit (PDU) session and an ID related to a multicast service, transmit, to the CN, a second request message indicating, to the CN, to use a multicast for the multicast service, and transmit, from a central unit-control plane (CU-CP) of the NG-RAN node to a distribution unit (DU) of the NG-RAN node, a third request message including the ID related to the multicast service, information about a radio data bearer configuration, and information about an area for the multicast service.

7. The apparatus of claim 6, wherein the first request message further includes a data transmission suspension indication indicating whether data transmission is suspended, and wherein, before transmitting the first request message, a multicast transmission channel and a unicast transmission channel is established.

8. The apparatus of claim 6, wherein the first request message further includes a relationship indication information of the PDU session and the multicast service, and wherein the processor is further configured to determine to use a multicast bearer to transmit the multicast data based on the relationship indication information during transmitting the multicast data by using a unicast channel.

9. The apparatus of claim 8, wherein the processor is further configured to:

count a number of users in each cell who use the multicast channel to receive the multicast data during transmitting the multicast data by using the multicast channel, and determine to use the unicast bearer to transmit the multicast data when the number of the users is lower than a predetermined threshold.

10. The apparatus of claim 8, wherein the processor is further configured to:

transmit, from the CU-CP, a bearer modification request message or a bearer release request message to a user plane (UP) of the access network to suspend the unicast bearer, and receive, by the CU-CP, a response message from the UP of the NG-RAN node.

* * * * *